(12) United States Patent
Ichikawa et al.

(10) Patent No.: US 9,379,572 B2
(45) Date of Patent: Jun. 28, 2016

(54) CONTACTLESS POWER TRANSMITTING DEVICE, CONTACTLESS POWER RECEIVING DEVICE, AND CONTACTLESS POWER TRANSFER SYSTEM

(71) Applicants: Shinji Ichikawa, Toyota (JP); Tetsuya Takura, Sendai (JP); Hidetoshi Matsuki, Sendai (JP); Fumihiro Sato, Sendai (JP)

(72) Inventors: Shinji Ichikawa, Toyota (JP); Tetsuya Takura, Sendai (JP); Hidetoshi Matsuki, Sendai (JP); Fumihiro Sato, Sendai (JP)

(73) Assignees: TOYOTA JIDOSHA KABUSHIKI KAISHA, Toyota (JP); TOHOKU UNIVERSITY, Sendai (JP)

( * ) Notice: Subject to any disclaimer, the term of this patent is extended or adjusted under 35 U.S.C. 154(b) by 283 days.

(21) Appl. No.: 13/872,672

(22) Filed: Apr. 29, 2013

(65) Prior Publication Data
US 2013/0335015 A1 Dec. 19, 2013

(30) Foreign Application Priority Data

Jun. 14, 2012 (JP) ................... 2012-134953

(51) Int. Cl.
*H02J 7/00* (2006.01)
*H02J 7/02* (2016.01)
(Continued)

(52) U.S. Cl.
CPC . *H02J 7/025* (2013.01); *B60L 7/14* (2013.01); *B60L 11/005* (2013.01); *B60L 11/126* (2013.01); *B60L 11/14* (2013.01); *B60L 11/182* (2013.01); *B60L 11/1824* (2013.01); *B60L 11/1833* (2013.01); *B60L 11/1846* (2013.01); *B60L 15/2009* (2013.01); *H02J 5/005* (2013.01); *B60L 2210/10* (2013.01); *B60L 2210/30* (2013.01); *B60L 2210/40* (2013.01); *B60L 2240/12* (2013.01); *B60L 2240/423* (2013.01); *B60L 2240/547* (2013.01); *B60L 2240/549* (2013.01); *B60L 2240/70* (2013.01); *B60L 2250/16* (2013.01); *Y02T 10/6217* (2013.01); *Y02T 10/645* (2013.01); *Y02T 10/7005* (2013.01); *Y02T 10/7022* (2013.01);
(Continued)

(58) Field of Classification Search
USPC ........................................... 320/108; 307/104
See application file for complete search history.

(56) References Cited

U.S. PATENT DOCUMENTS

| 5,821,731 A * | 10/1998 | Kuki et al. ..................... 320/108 |
| 2003/0210106 A1 * | 11/2003 | Cheng ....................... H01F 3/02 333/24 R |

(Continued)

FOREIGN PATENT DOCUMENTS

| JP | A-2011-15549 | 1/2011 |
| JP | A-2012-157126 | 8/2012 |

*Primary Examiner* — Richard Isla Rodas
*Assistant Examiner* — David V Henze-Gongola
(74) *Attorney, Agent, or Firm* — Oliff PLC

(57) ABSTRACT

A power transmitting device includes: a power transmitting unit being able to contactlessly transmit electric power to a power receiving unit of a power receiving device; and a guide unit changing a guide position of the power receiving device at power reception of the power receiving device on the basis of a type of the power receiving unit. The guide unit may when the types of the power receiving and transmitting units are the same, set a position of the power receiving unit, at which center positions of the power receiving and transmitting units coincide with each other, for the guide position, and, when the types of the power receiving and transmitting units are different, set a position of the power receiving unit, at which the center positions of the power receiving and transmitting units deviate from each other, for the guide position.

18 Claims, 20 Drawing Sheets

(51) Int. Cl.
  *H02J 5/00*    (2016.01)
  *B60L 7/14*    (2006.01)
  *B60L 11/00*   (2006.01)
  *B60L 11/12*   (2006.01)
  *B60L 11/14*   (2006.01)
  *B60L 11/18*   (2006.01)
  *B60L 15/20*   (2006.01)

(52) U.S. Cl.
  CPC ......... *Y02T 10/7072* (2013.01); *Y02T 10/7077* (2013.01); *Y02T 10/7216* (2013.01); *Y02T 10/7241* (2013.01); *Y02T 10/7275* (2013.01); *Y02T 10/7291* (2013.01); *Y02T 90/121* (2013.01); *Y02T 90/122* (2013.01); *Y02T 90/125* (2013.01); *Y02T 90/127* (2013.01); *Y02T 90/128* (2013.01); *Y02T 90/14* (2013.01); *Y02T 90/16* (2013.01); *Y02T 90/163* (2013.01); *Y02T 90/169* (2013.01); *Y04S 30/14* (2013.01)

(56) References Cited

U.S. PATENT DOCUMENTS

2011/0049995 A1* 3/2011 Hashiguchi .................. 307/104
2012/0112531 A1* 5/2012 Kesler .................. B60L 11/182
                                                                 307/9.1

* cited by examiner

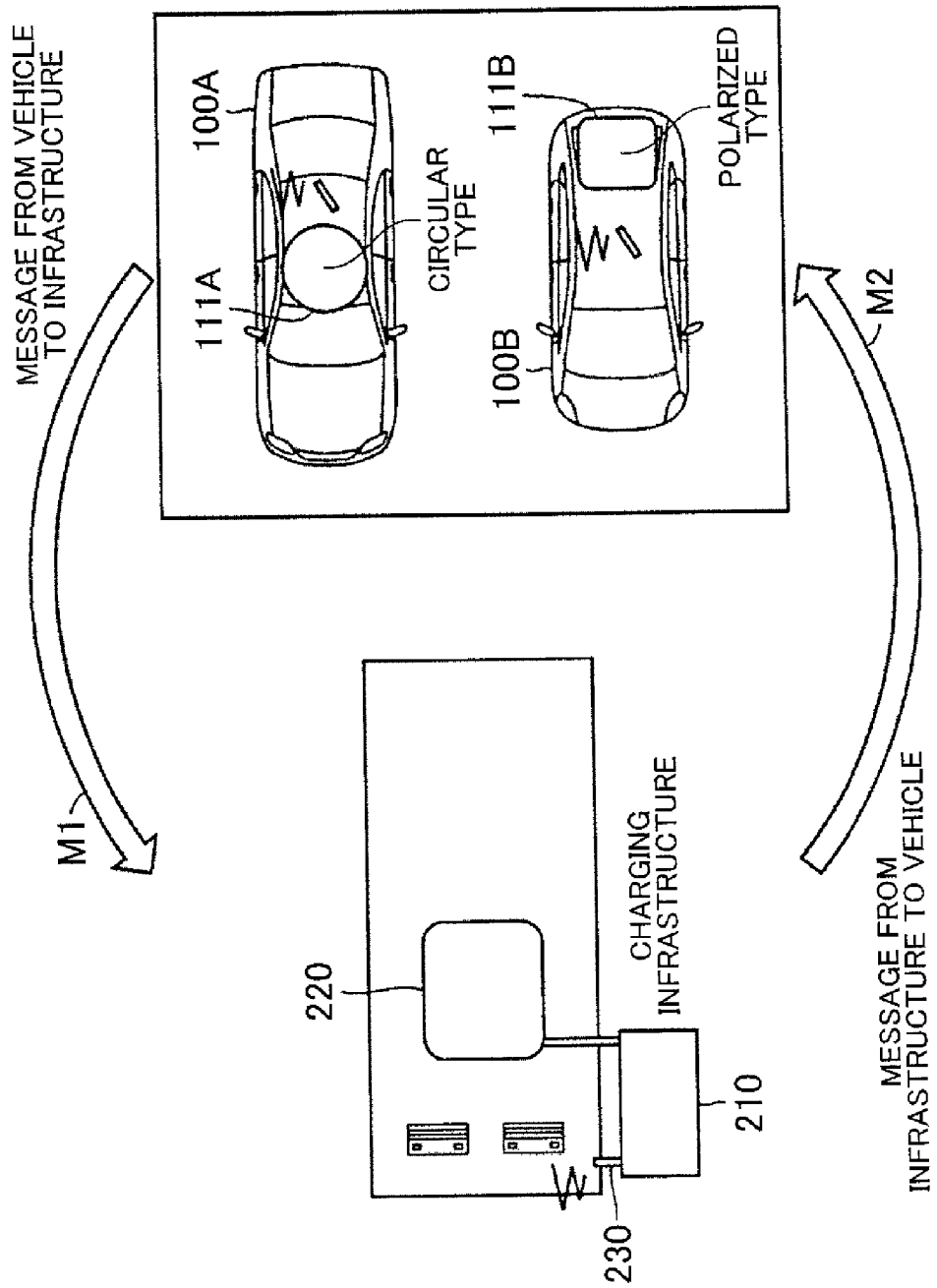

$\Delta X = 0$
$\Delta Y = 0$
$k \approx k_{max}$

F I G . 29
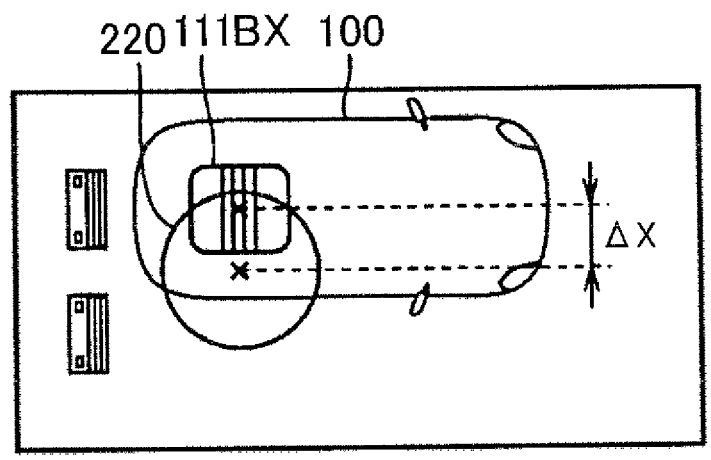

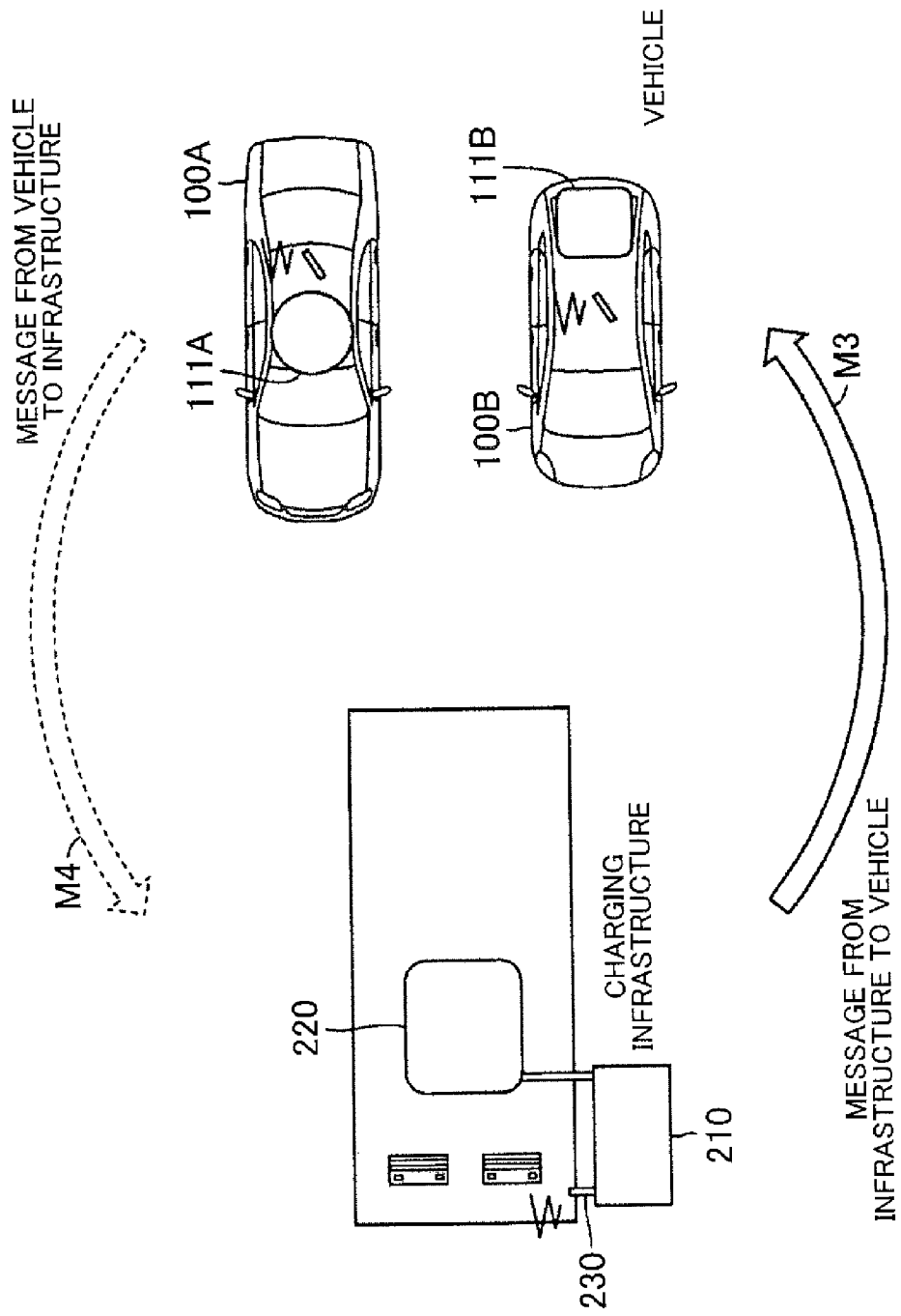

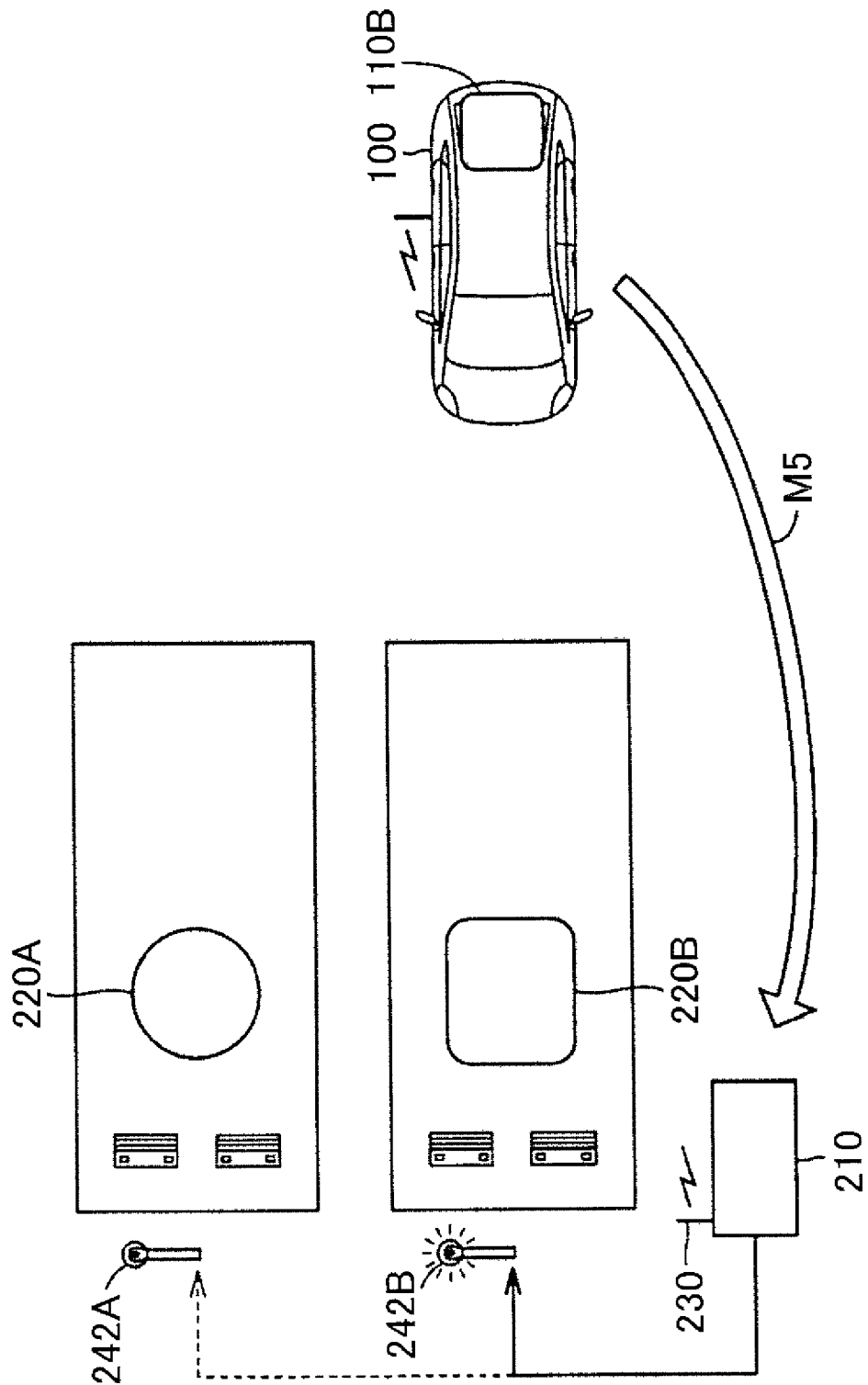

(1)

CONTACTLESS POWER TRANSMITTING DEVICE, CONTACTLESS POWER RECEIVING DEVICE, AND CONTACTLESS POWER TRANSFER SYSTEM

INCORPORATION BY REFERENCE

The disclosure of Japanese Patent Application No. 2012-134953 filed on Jun. 14, 2012 including the specification, drawings and abstract is incorporated herein by reference in its entirety.

BACKGROUND OF THE INVENTION

1. Field of the Invention

The invention relates to a contactless power transmitting device, a contactless power receiving device and a contactless power transfer system.

2. Description of Related Art

In recent years, a technique for contactlessly transmitting or receiving power to or from a device becomes a focus of attention because of less expense in time and effort for connection, or the like. Contactless charging is in practical use for charging a portable device, an electric vehicle, or the like.

Japanese Patent Application Publication No. 2011-15549 (JP 2011-15549 A) describes an example of a position aligning technique for a contactless power transfer device for a vehicle. In this example, a spatial position is acquired through an image captured by a camera for capturing an area behind the vehicle, and the vehicle is guided to a parking position or the vehicle is automatically parked.

JP 2011-15549 A does not describe the details of coil units that are used to transmit and receive electric power. Coil units of a plurality of types have been studied for use in a power transmitting unit and a power receiving unit.

In contactless power supply, a magnetic flux distribution that is generated in a coil unit or a magnetic flux distribution suitable for a coil unit to receive electric power varies on the basis of a coil shape, a winding method, a magnetic core shape, and the like. When the magnetic flux distributions of a pair of power transmitting portion and power receiving portion are different from each other, it is not possible to efficiently transmit or receive electric power. It is inconvenient that electric power cannot be transmitted or received at all because of a mismatch between the magnetic flux distribution of the power transmitting portion and the magnetic flux distribution of the power receiving portion.

Depending on a coil type, the transfer efficiency may be higher when there is a positional deviation than when there is no positional deviation. Therefore, when a power receiving device is guided to the same position irrespective of a coil type, it may lead to a case where the transfer efficiency deteriorates.

SUMMARY OF THE INVENTION

The invention provides a contactless power transmitting device, a contactless power receiving device and a contactless power transfer system that are able to align the position of a power transmitting unit with the position of a power receiving unit in a high power transmission efficiency state.

An aspect of the invention provides a contactless power transmitting device that includes: a power transmitting unit configured to be able to contactlessly transmit electric power to a power receiving unit installed in a power receiving device; and a guide unit configured to change a guide position, to which the power receiving device is guided at the time when the power receiving device receives electric power, on the basis of a type of the power receiving unit.

The guide unit may be configured to, in the case where the type of the power receiving unit and a type of the power transmitting unit are the same, set a position of the power receiving unit, at which a center position of the power receiving unit coincides with a center position of the power transmitting unit, for the guide position, and, in the case where the type of the power receiving unit and the type of the power transmitting unit are different from each other, set a position of the power receiving unit, at which the center position of the power receiving unit deviates from the center position of the power transmitting unit, for the guide position.

The type of each of the power transmitting unit and the power receiving unit may be classified on the basis of a structure of a component of the power transmitting unit or power receiving unit, which influences a magnetic flux distribution that is generated in the power transmitting unit and the power receiving unit at the time of transmission of electric power.

The guide unit may be configured to, in the case where the type of the power receiving unit is a polarized coil type, determine the guide position in consideration of an orientation in which the power receiving unit is installed in the power receiving device.

The power receiving device may be a vehicle. The guide unit may be configured to inform a parking position at the time when the vehicle receives electric power to a user of the vehicle as the guide position.

The power receiving device may be a vehicle. The guide unit may be configured to assist in parking the vehicle such that a parking position at the time when the vehicle receives electric power is determined.

A difference between the natural frequency of the power transmitting unit and the natural frequency of the power receiving unit may fall within the range of ±10%.

A coupling coefficient between the power receiving unit and the power transmitting unit may be smaller than or equal to 0.1. The power transmitting unit may be configured to transmit electric power to the power receiving unit through at least one of a magnetic field that is formed between the power receiving unit and the power transmitting unit and that oscillates at a predetermined frequency and an electric field that is formed between the power receiving unit and the power transmitting unit and that oscillates at a predetermined frequency.

Another aspect of the invention provides a contactless power receiving device that is contactlessly chargeable from a power transmitting device. The contactless power receiving device includes: a power receiving unit configured to be able to contactlessly receive electric power from a power transmitting unit installed in the power transmitting device; and a guide unit configured to change a guide position, to which the power receiving device is guided at the time when the power receiving device receives electric power, on the basis of a type of the power transmitting unit.

The guide unit may be configured to, in the case where a type of the power receiving unit and the type of the power transmitting unit are the same, set a position of the power receiving unit, at which a center position of the power receiving unit coincides with a center position of the power transmitting unit, for the guide position and, in the case where the type of the power receiving unit and the type of the power transmitting unit are different from each other, set a position of the power receiving unit, at which the center position of the power receiving unit deviates from the center position of the power transmitting unit, for the guide position.

The type of each of the power transmitting unit and the power receiving unit may be classified on the basis of a structure of a component of the power transmitting unit or power receiving unit, which influences a magnetic flux distribution that is generated in the power transmitting unit and the power receiving unit at the time of reception of electric power.

The guide unit may be configured to, in the case where the type of the power transmitting unit is a polarized coil type, determine the guide position in consideration of an orientation in which the power transmitting unit is installed in the power transmitting device.

The power receiving device may be a vehicle, and the guide unit may be configured to inform a parking position at the time when the vehicle receives electric power to a user of the vehicle as the guide position.

The power receiving device may be a vehicle, and the guide unit may be configured to assist in parking the vehicle such that a parking position at the time when the vehicle receives electric power is determined.

A difference between the natural frequency of the power transmitting unit and the natural frequency of the power receiving unit may fall within the range of ±10%.

A coupling coefficient between the power receiving unit and the power transmitting unit may be smaller than or equal to 0.1. The power receiving unit may be configured to receive electric power from the power transmitting unit through at least one of a magnetic field that is formed between the power receiving unit and the power transmitting unit and that oscillates at a predetermined frequency and an electric field that is formed between the power receiving unit and the power transmitting unit and that oscillates at a predetermined frequency.

A further another aspect of the invention provides a contactless power transfer system that includes: a power receiving device; and a power transmitting device configured to contactlessly transmit electric power to the power receiving device. The power transmitting device includes: a power transmitting unit configured to be able to contactlessly transmit electric power to a power receiving unit installed in the power receiving device; and a guide unit configured to change a guide position, to which the power receiving device is guided at the time when the power receiving device receives electric power, on the basis of a type of the power receiving unit.

Yet another aspect of the invention provides a contactless power transfer system that includes: a power transmitting device; and a power receiving device configured to contactlessly receive electric power from the power transmitting device. The power receiving device includes: a power receiving unit configured to be able to contactlessly receive electric power from a power transmitting unit installed in the power transmitting device; and a guide unit configured to change a guide position, to which the power receiving device is guided at the time when the power receiving device receives electric power, on the basis of a type of the power transmitting unit.

With the contactless power transmitting device, contactless power receiving device and contactless power transfer system according to the aspects of the invention, it is possible to align the position of the power transmitting unit with the position of the power receiving unit in a high power transmission efficiency state.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 15 is a view for illustrating the operation of a contactless power transfer system according to a first embodiment;

FIG. 29 is a view for illustrating a parking position (target position) in the case where the power transmitting unit includes a circular coil and the power receiving unit includes a laterally-oriented polarized coil;

FIG. 30 is a view for illustrating the operation of a contactless power transfer system according to a second embodiment;

FIG. 32 is a view for illustrating an alternative embodiment to the above-described embodiment.

DETAILED DESCRIPTION OF EMBODIMENTS

Figure 1:
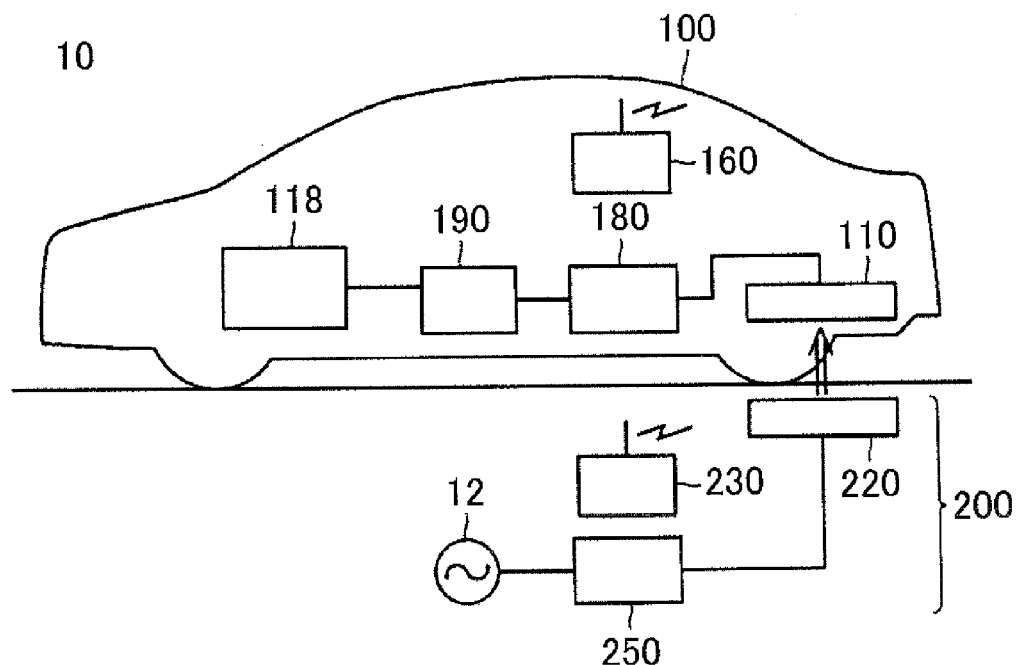
FIG. 1 is an overall block diagram that shows an example of a contactless power transfer system.

Hereinafter, embodiments of the invention will be described in detail with reference to the accompanying drawings. Like reference numerals denote the same or corresponding components, and the description thereof is not repeated.

The overall configuration of a contactless power transfer system will be described. FIG. 1 is an overall block diagram that shows an example of the contactless power transfer system. An electric vehicle that uses a rotating electrical machine as a driving source is illustrated as a vehicle 100; however, the vehicle 100 may be another automobile as long as it contactlessly receives electric power, and, furthermore, a power receiving object may not be a vehicle.

As shown in FIG. 1, the contactless power transfer system includes a power transmitting device 200 and the vehicle 100. The power transmitting device 200 includes a power supply unit 250, a power transmitting unit 220 and a communication unit 230. The vehicle 100 includes a power receiving unit 110, a rectifier 180, an electrical storage device 190 and a power generating device 118.

The power supply unit 250 generates high-frequency alternating-current power upon reception of electric power from a power supply 12. The power supply 12 may be a commercial power supply or may be an independent power supply device. The power transmitting unit 220 receives high-frequency alternating-current power supplied from the power supply unit 250, and contactlessly transfers electric power to the power receiving unit 110. As an example, the power transmitting unit 220 is formed of a resonance circuit that includes a coil and a capacitor.

On the other hand, in the vehicle 100, the power receiving unit 110 contactlessly receives electric power that is transmitted from the power transmitting unit 220 of the power transmitting device 200, and outputs the received electric power to the rectifier 180. As an example, the power receiving unit 110 is also formed of a resonance circuit that includes a coil and a capacitor.

The rectifier 180 converts alternating-current power, which is received from the power receiving unit 110, to direct-current power, and outputs the converted direct-current power to the electrical storage device 190. Thus, the rectifier 180 charges the electrical storage device 190. The electrical storage device 190 stores electric power that is output from the rectifier 180, and also stores electric power that is generated by the power generating device 118. The electrical storage device 190 supplies the stored electric power to the power generating device 118. A large-capacitance capacitor may be employed as the electrical storage device 190.

The power generating device 118 generates driving force for propelling the vehicle 100 by using electric power stored in the electrical storage device 190. Although not specifically shown in FIG. 1, the power generating device 118, for example, includes an inverter that receives electric power from the electrical storage device 190, a motor that is driven by the inverter, drive wheels that are driven by the motor, and the like. The power generating device 118 may include a generator for charging the electrical storage device 190 and an engine that is able to drive the generator.

In the contactless power transfer system, the natural frequency of the power transmitting unit 220 of the power transmitting device 200 is the same as the natural frequency of the power receiving unit 110 of the vehicle 100. Here, the natural frequency of the power transmitting unit 220 (power receiving unit 110) means an oscillation frequency in the case where the electric circuit (resonance circuit) that constitutes the power transmitting unit 220 (power receiving unit 110) freely oscillates. In the electric circuit (resonance circuit) that constitutes the power transmitting unit 220 (power receiving unit 110), the natural frequency at the time when braking force or electrical resistance is zero or substantially zero is also called the resonance frequency of the power transmitting unit 220 (power receiving unit 110).

The meaning of the phrase that the natural frequency is the same not only includes the case where the natural frequency is completely the same but also the case where the natural frequency is substantially the same. The phrase that the natural frequency is substantially the same, for example, means the case where the difference between the natural frequency of the power transmitting unit 220 and the natural frequency of the power receiving unit 110 falls within 10% of the natural frequency of one of the power transmitting unit 220 and the power receiving unit 110.

In the power transfer system according to the present embodiment, the difference between the natural frequency of the power transmitting unit 220 and the natural frequency of the power receiving unit 110 is smaller than or equal to 10% of the natural frequency of one of the power receiving unit 110 and the power transmitting unit 220. By setting the natural frequency of each of the power transmitting unit 220 and the power receiving unit 110 within the above range, it is possible to increase the power transfer efficiency. On the other hand, when the difference in natural frequency is larger than 10% of the natural frequency of one of the power receiving unit 110 and the power transmitting unit 220, the power transfer efficiency becomes lower than 10%, so there may occur an inconvenience, such as an increase in the charging time of the electrical storage device 190.

The power transmitting unit 220 contactlessly transmits electric power to the power receiving unit 110 of the vehicle 100 via at least one of a magnetic field that is formed between the power transmitting unit 220 and the power receiving unit 110 and that oscillates at a predetermined frequency and an electric field that is formed between the power transmitting unit 220 and the power receiving unit 110 and that oscillates at a predetermined frequency. Then, a coupling coefficient K between the power transmitting unit 220 and the power receiving unit 110 is, for example, smaller than or equal to about 0.3, and is desirably smaller than or equal to 0.1. Of course, the coupling coefficient κ that ranges from about 0.1 to 0.3 may also be employed. The coupling coefficient κ is not limited to such values; it may be various values at which power transfer is good. The power transmitting unit 220 and the power receiving unit 110 are designed such that the product of the coupling coefficient κ and a Q value that indicates a resonance strength is larger than or equal to a predetermined value (for example, 1.0).

In this way, by resonating the power transmitting unit 220 and the power receiving unit 110 through the electromagnetic field, electric power is contactlessly transferred from the power transmitting unit 220 of the power transmitting device 200 to the power receiving unit 110 of the vehicle 100.

As described above, in the contactless power transfer system, by resonating the power transmitting unit 220 and the power receiving unit 110 through the electromagnetic field, electric power is contactlessly transferred from the power transmitting unit 220 to the power receiving unit 110. Coupling between the power transmitting unit 220 and the power receiving unit 110 in power transfer is, for example, called magnetic resonance coupling, magnetic field resonance coupling, near field resonance coupling, electromagnetic field resonance coupling, electric field resonance coupling, or the like. The electromagnetic field resonance coupling means coupling that includes the magnetic resonance coupling, the magnetic field resonance coupling and the electric field resonance coupling.

When the power transmitting unit 220 and the power receiving unit 110 are formed of coils as described above, the power transmitting unit 220 and the power receiving unit 110 are mainly coupled through a magnetic field, and magnetic resonance coupling or magnetic field resonance coupling is formed. For example, an antenna, such as a meander line antenna, may be employed as each of the power transmitting unit 220 and the power receiving unit 110. In this case, the power transmitting unit 220 and the power receiving unit 110 are mainly coupled through an electric field, and electric field resonance coupling is formed.

Figure 2:
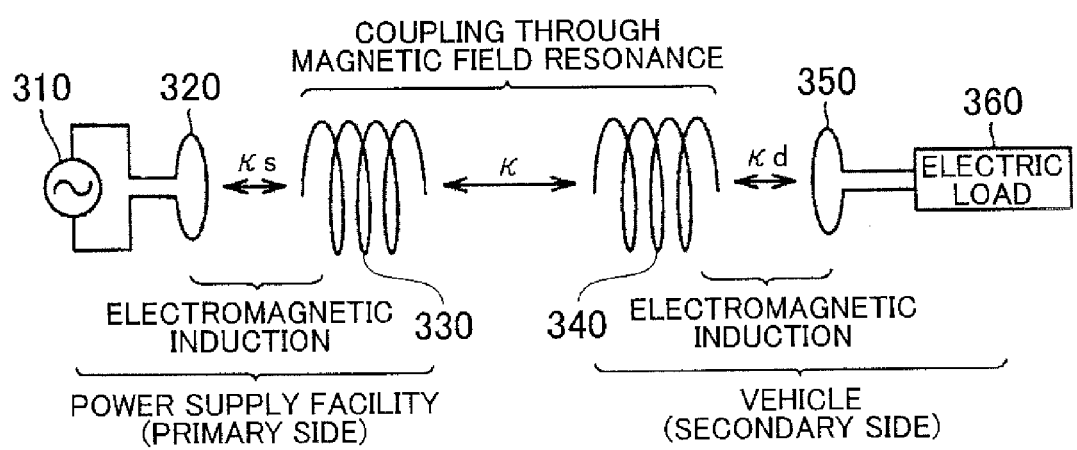
FIG. 2 is a schematic view for illustrating the principle of transmission of electric power through a resonance method.

FIG. 2 is a schematic view for illustrating the principle of transmission of electric power through a resonance method. Referring to. FIG. 2, in the resonance method, as in the case where two tuning forks resonate with each other, two LC resonance coils having the same natural frequency resonate with each other in an electromagnetic field (near field) to thereby transfer electric power from one of the coils to the other one of the coils.

Specifically, a primary coil 320 is connected to a high-frequency power supply 310, and high-frequency electric power is supplied through electromagnetic induction to a primary self-resonance coil 330 that is magnetically coupled to the primary coil 320. The primary self-resonance coil 330 is an LC resonator formed of the inductance and stray capacitance of the coil itself, and resonates via an electromagnetic field (near field) with a secondary self-resonance coil 340 having the same resonance frequency as the primary self-resonance coil 330. Then, energy (electric power) is transferred from the primary self-resonance coil 330 to the secondary self-resonance coil 340. Energy (electric power) transferred to the secondary self-resonance coil 340 is extracted using a secondary coil 350 that is magnetically coupled to the secondary self-resonance coil 340 via electromagnetic induction, and is supplied to an electric load 360. Transmission of electric power through the resonance method is implemented when the Q value that indicates the resonance strength between the primary self-resonance coil 330 and the secondary self-resonance coil 340 is larger than, for example, 100.

In the power transfer system according to the present embodiment, electric power is transmitted from the power transmitting unit to the power receiving unit by resonating the power transmitting unit and the power receiving unit through the electromagnetic field, and the coupling coefficient κ between the power transmitting unit and the power receiving unit is, for example, smaller than or equal to about 0.3, and is desirably smaller than or equal to 0.1. Of course, the coupling coefficient κ that ranges from about 0.1 to 0.3 may also be employed. The coupling coefficient κ is not limited to such values; it may be various values at which power transfer is good. Generally, in power transfer that utilizes electromagnetic induction, the coupling coefficient κ between the power transmitting portion and the power receiving portion is close to 1.0.

The correspondence relationship between FIG. 2 and FIG. 1 is that the secondary self-resonance coil 340 and the secondary coil 350 correspond to the power receiving unit 110 shown in FIG. 1 and the primary coil 320 and the primary self-resonance coil 330 correspond to the power transmitting unit 220 shown in FIG. 1.

Figure 3:
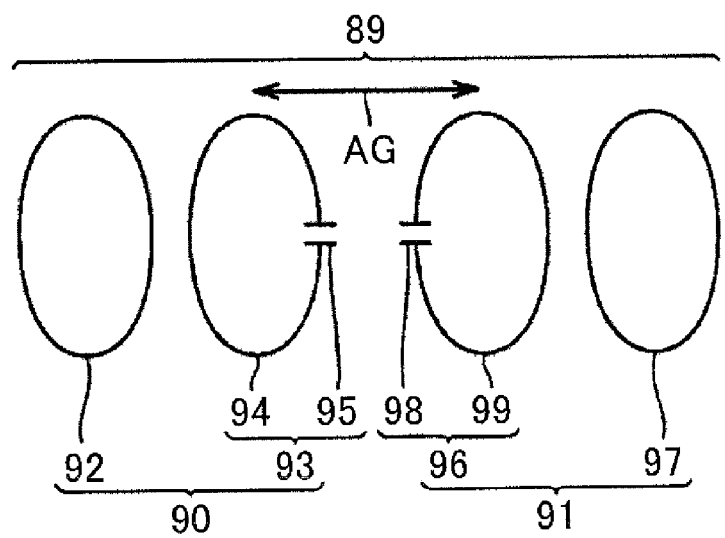
FIG. 3 is a view that shows a simulation model of a power transfer system.

Next, the simulation result obtained by analyzing the correlation between a difference in natural frequency and a power transfer efficiency will be described with reference to FIG. 3 and FIG. 4. FIG. 3 shows a simulation model of a power transfer system. The power transfer system 89 includes a power transmitting unit 90 and a power receiving unit 91. The power transmitting unit 90 includes an electromagnetic induction coil 92 and a power transmitting portion 93. The power transmitting portion 93 includes a resonance coil 94 and a capacitor 95 provided in the resonance coil 94.

The power receiving unit 91 includes a power receiving portion 96 and an electromagnetic induction coil 97. The power receiving portion 96 includes a resonance coil 99 and a capacitor 98 that is connected to the resonance coil 99.

The inductance of the resonance coil 94 is set to Lt, and the capacitance of the capacitor 95 is set to C1. The inductance of the resonance coil 99 is set to Lr, and the capacitance of the capacitor 98 is set to C2. When the parameters are set in this way, the natural frequency f1 of the power transmitting portion 93 is expressed by the following mathematical expression (1), and the natural frequency f2 of the power receiving portion 96 is expressed by the following mathematical expression (2).

$$f1 = 1/\{2\pi(Lt \times C1)^{1/2}\} \quad (1)$$

$$f2 = 1/\{2\pi(Lr \times C2)^{1/2}\} \quad (2)$$

Figure 4:
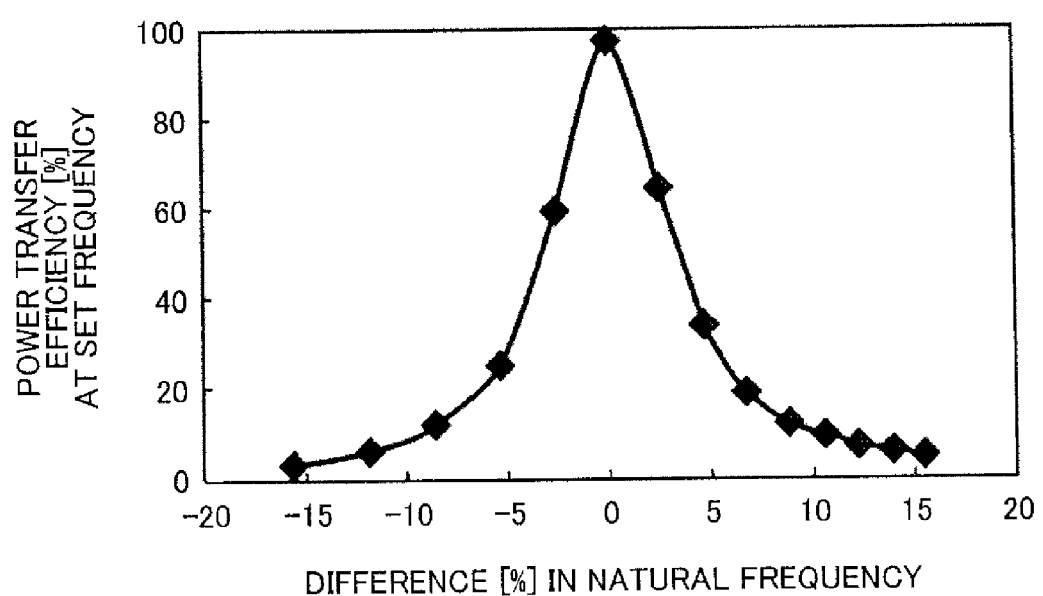
FIG. 4 is a graph that shows the correlation between a difference in natural frequency of each of a power transmitting portion and a power receiving portion that are shown in FIG. 3 and a power transfer efficiency.

FIG. 4 is a graph that shows the correlation between a difference in the natural frequency of each of the power transmitting portion 93 and the power receiving portion 96 and a power transfer efficiency. FIG. 4 shows the case where the inductance Lr and the capacitances C1 and C2 are fixed and only the inductance Lt is varied.

In this simulation, a relative positional relationship between the resonance coil 94 and the resonance coil 99 is fixed, and, furthermore, the frequency of current that is supplied to the power transmitting portion 93 is constant.

As shown in FIG. 4, the abscissa axis represents a difference Df (%) in natural frequency, and the ordinate axis represents a power transfer efficiency (%) at a set frequency. The difference Df (%) in natural frequency is expressed by the following mathematical expression (3).

$$(\text{Difference in Natural Frequency}) = \{(f1-f2)/f2\} \times 100(\%) \quad (3)$$

As is apparent from FIG. 4, when the difference (%) in natural frequency is ±0%, the power transfer efficiency is close to 100%. When the difference (%) in natural frequency is ±5%, the power transfer efficiency is 40%. When the difference (%) in natural frequency is ±10%, the power transfer efficiency is 10%. When the difference (%) in natural frequency is ±15%, the power transfer efficiency is 5%. That is, it is found that, by setting the natural frequency of each of the power transmitting portion and the power receiving portion such that the absolute value of the difference (%) in natural frequency (difference in natural frequency) is smaller than or equal to 10% of the natural frequency of the power receiving portion 96, it is possible to increase the power transfer efficiency. Furthermore, by setting the natural frequency of each of the power transmitting portion and the power receiving portion such that the absolute value of the difference (%) in natural frequency is smaller than or equal to 5% of the natural frequency of the power receiving portion 96, it is possible to further increase the power transfer efficiency, so it is more desirable. The electromagnetic field analyzation software application (JMAG (trademark): produced by JSOL Corporation) is employed as a simulation software application.

Here, the magnetic field having the predetermined frequency, which is formed around the resonance coil in the power transmitting unit 220 shown in FIG. 1, will be described. The "magnetic field having the predetermined frequency" typically correlates with the power transfer efficiency and the frequency of current that is supplied to the resonance coil of the power transmitting unit 220. Then, first, the correlation between the power transfer efficiency and the frequency of current that is supplied to the resonance coil of the power transmitting unit 220 will be described. The power transfer efficiency at the time when electric power is transferred from the resonance coil of the power transmitting unit 220 to the resonance coil of the power receiving unit 110 varies depending on various factors, such as a distance between the resonance coil of the power transmitting unit 220 and the resonance coil of the power receiving unit 110. For example, the natural frequency (resonance frequency) of each of the power transmitting unit 220 and the power receiving unit 110 is set to f0, the frequency of current that is supplied to the resonance coil of the power transmitting unit 220 is set to f3, and the air gap between the resonance coil of the power receiving unit 110 and the resonance coil of the power transmitting unit 220 is set to AG.

Figure 5:
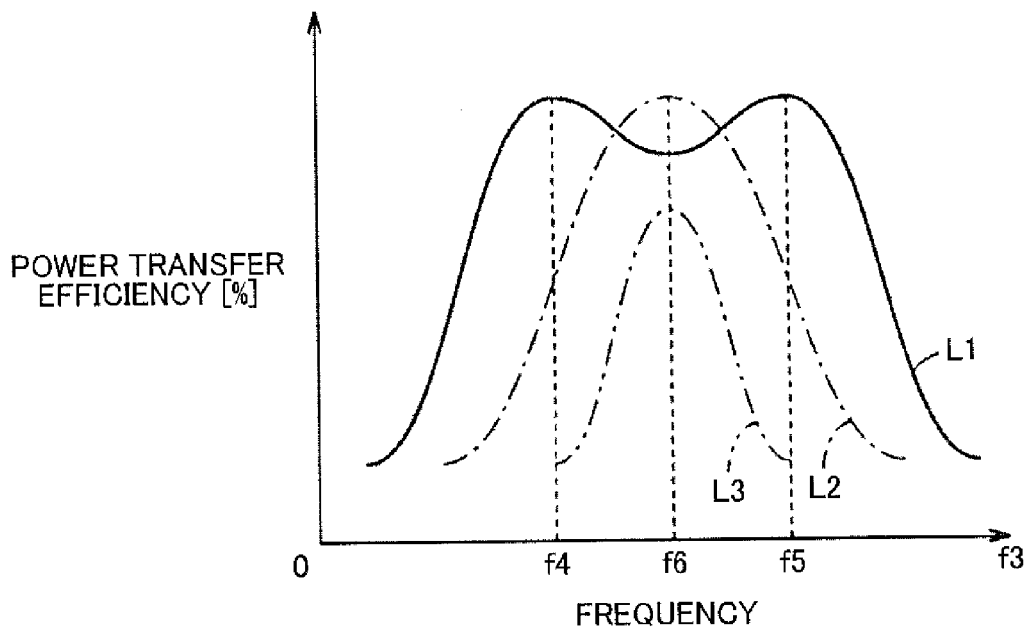
FIG. 5 is a graph that shows the correlation between a power transfer efficiency at the time when an air gap is varied and the frequency of a current that is supplied to a resonance coil in a power transmitting unit in a state where the natural frequency is fixed in FIG. 3.

FIG. 5 is a graph that shows the correlation between a power transfer efficiency and the frequency f3 of current that is supplied to the resonance coil of the power transmitting unit 220 shown in FIG. 1 at the time when the air gap AG is varied in a state where the natural frequency f0 is fixed.

In the graph of FIG. 5, the abscissa axis represents the frequency f3 of current that is supplied to the resonance coil of the power transmitting unit 220, and the ordinate axis represents a power transfer efficiency (%). An efficiency curve L1 schematically shows the correlation between a power transfer efficiency and the frequency f3 of current that is supplied to the resonance coil of the power transmitting unit 220 when the air gap AG is small. As indicated by the efficiency curve L1, when the air gap AG is small, the peak of the power transfer efficiency appears at frequencies f4 and f5 (f4<f5). When the air gap AG is increased, two peaks at which the power transfer efficiency is high vary so as to approach each other. Then, as indicated by an efficiency curve L2, when the air gap AG is increased to be longer than a predetermined distance, the number of the peaks of the power transfer efficiency is one, the power transfer efficiency becomes a peak when the frequency of current that is supplied to the resonance coil of the power transmitting unit 220 is f6. When the air gap AG is further increased from the state of the efficiency curve L2, the peak of the power transfer efficiency reduces as indicated by an efficiency curve L3.

For example, the following first method is conceivable as a method of improving the power transfer efficiency. In the first method, by varying the capacitances of the capacitors in accordance with the air gap AG while the frequency of current that is supplied to the resonance coil of the power transmitting unit 220 shown in FIG. 1 is constant, the characteristic of power transfer efficiency between the power transmitting unit 220 and the power receiving unit 110 is varied. Specifically, the capacitances of the capacitors are adjusted such that the power transfer efficiency becomes a peak in a state where the frequency of current that is supplied to the resonance coil of the power transmitting unit 220 is constant. In this method, irrespective of the size of the air gap AG, the frequency of current flowing through the resonance coil of the power transmitting unit 220 and the resonance coil of the power receiving unit 110 is constant. As a method of varying the characteristic of power transfer efficiency, a method of utilizing a matching transformer provided between the power transmitting unit 220 and the power supply unit 250, a method of utilizing a power receiving-side converter, or the like, may be employed.

In addition, in the second method, the frequency of current that is supplied to the resonance coil of the power transmitting unit 220 is adjusted on the basis of the size of the air gap AG For example, as shown in FIG. 5, when the power transfer characteristic becomes the efficiency curve L1, current having the frequency f4 or the frequency f5 is supplied to the resonance coil of the power transmitting unit 220. When the frequency characteristic becomes the efficiency curve L2 or the efficiency curve L3, current having the frequency f6 is supplied to the resonance coil of the power transmitting unit 220. In this case, the frequency of current flowing through the resonance coil of the power transmitting unit 220 and the resonance coil of the power receiving unit 110 is varied in accordance with the size of the air gap AG.

In the first method, the frequency of current flowing through the resonance coil of the power transmitting unit 220 is a fixed constant frequency, and, in the second method, the frequency of current flowing through the resonance coil of the power transmitting unit 220 is a frequency that appropriately varies with the air gap AG. Through the first method, the second method, or the like, current having the predetermined frequency set such that the power transfer efficiency is high is supplied to the resonance coil of the power transmitting unit 220. When current having the predetermined frequency flows through the resonance coil of the power transmitting unit 220, a magnetic field (electromagnetic field) that oscillates at the predetermined frequency is formed around the resonance coil of the power transmitting unit 220. The power receiving unit 110 receives electric power from the power transmitting unit 220 through the magnetic field that is formed between the power receiving unit 110 and the power transmitting unit 220 and that oscillates at the predetermined frequency. Thus, the "magnetic field that oscillates at the predetermined frequency" is not necessarily a magnetic field having a fixed frequency. In the above-described embodiment, the frequency of current that is supplied to the resonance coil of the power transmitting unit 220 is set by focusing on the air gap AG; however, the power transfer efficiency also varies on the basis of other factors, such as a deviation in horizontal position between the resonance coil of the power transmitting unit 220 and the resonance coil of the power receiving unit 110, so the frequency of current that is supplied to the resonance coil of the power transmitting unit 220 may possibly be adjusted on the basis of those other factors.

Figure 6:
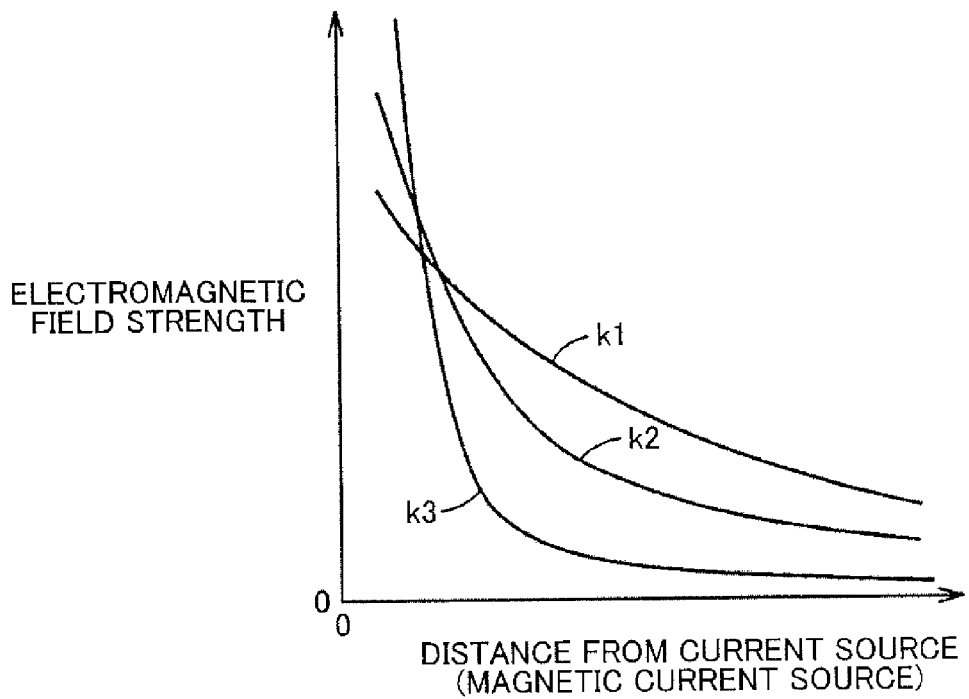
FIG. 6 is a graph that shows the correlation between a distance from a current source (magnetic current source) and the strength of an electromagnetic field in FIG. 3.

In the power transfer system according to the present embodiment, a near field (evanescent field) in which the static electromagnetic field of an electromagnetic field is dominant is utilized. Thus, power transmitting and power receiving efficiencies are improved. FIG. 6 is a graph that shows the correlation between a distance from a current source (magnetic current source) and the strength of an electromagnetic field. As shown in FIG. 6, the electromagnetic field consists of three components. The curve k1 is a component that is inversely proportional to the distance from a wave source, and is called radiation electromagnetic field. The curve k2 is a component that is inversely proportional to the square of the distance from the wave source, and is called induction electromagnetic field. In addition, the curve k3 is a component that is inversely proportional to the cube of the distance from the wave source, and is called static electromagnetic field. Where the wavelength of the electromagnetic field is $\lambda$, a distance at which the strengths of the radiation electromagnetic field, induction electromagnetic field and static electromagnetic field are substantially equal to one another may be expressed as $\lambda/2\pi$.

The static electromagnetic field is a region in which the strength of electromagnetic field steeply reduces with a distance from a wave source, and, in the power transfer system according to the present embodiment, a near field (evanescent field) in which the static electromagnetic field is dominant is utilized to transfer energy (electric power). That is, by resonating the power transmitting unit 220 and the power receiving unit 110 (for example, a pair of LC resonance coils) having the close natural frequencies in the near field in which the static electromagnetic field is dominant, energy (electric power) is transferred from the power transmitting unit 220 to the other power receiving unit 110. The static electromagnetic field does not propagate energy over a long distance, so the resonance method is able to transmit electric power with less loss of energy in comparison with an electromagnetic wave that transmits energy (electric power) through the radiation electromagnetic field that propagates energy over a long distance.

In this way, in the power transfer system, by resonating the power transmitting portion and the power receiving portion through the electromagnetic field, electric power is contactlessly transferred between the power transmitting portion and the power receiving portion. Such an electromagnetic field that is formed between the power receiving portion and the power transmitting portion may be, for example, called a near field resonance coupling field. Then, a coupling coefficient κ between the power transmitting portion and the power receiving portion is, for example, smaller than or equal to about 0.3, and is desirably smaller than or equal to 0.1. Of course, the coupling coefficient κ that ranges from about 0.1 to 0.3 may also be employed. The coupling coefficient κ is not limited to such values; it may be various values at which power transfer is good.

Figure 7:
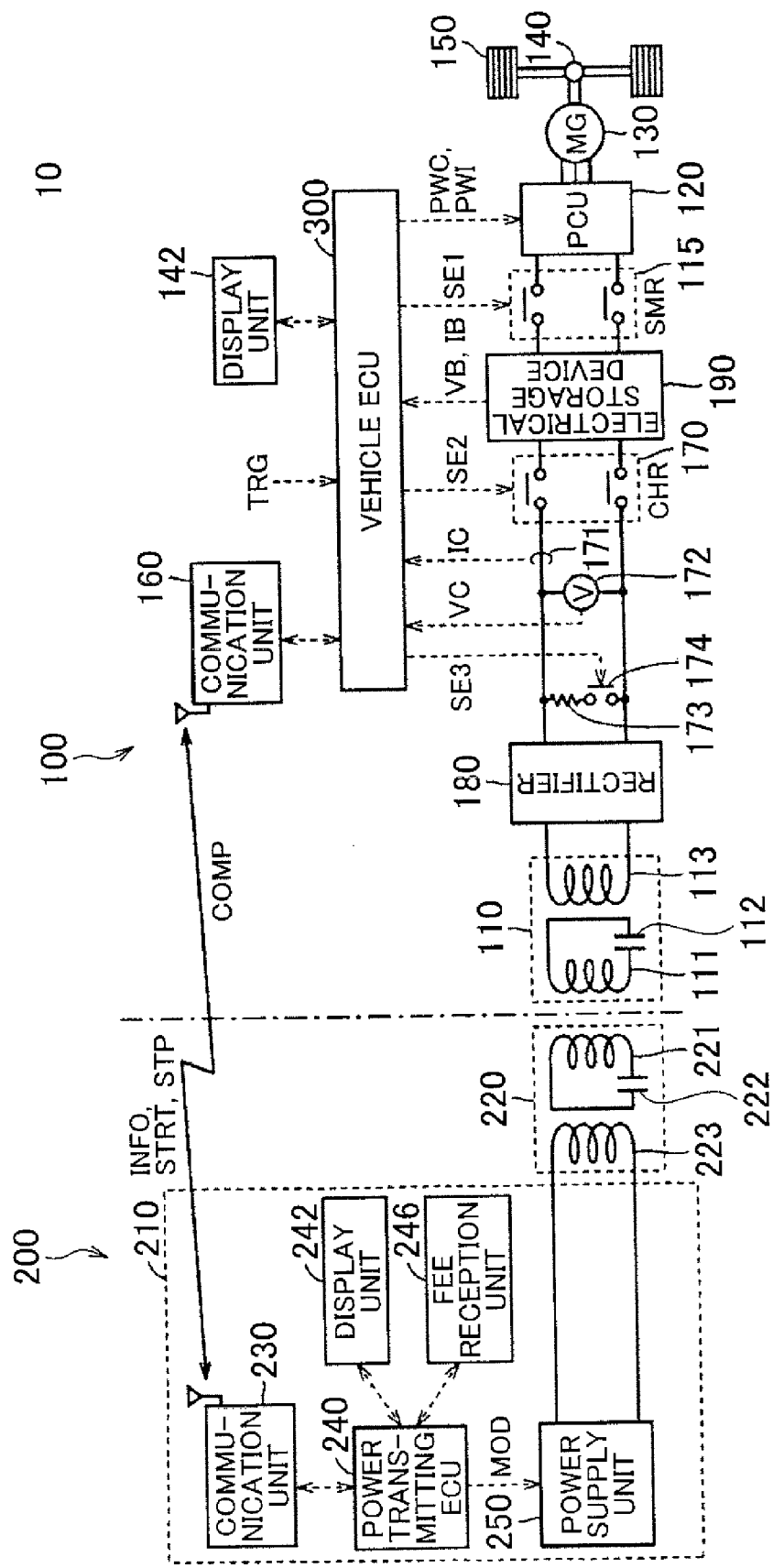
FIG. 7 is a circuit diagram that shows the detailed configuration of the power transfer system shown in FIG. 1.

Next, the detailed configuration of contactless power transfer will be described. FIG. 7 is a circuit diagram that shows the detailed configuration of a power transfer system 10 shown in FIG. 1. As shown in FIG. 7, the vehicle 100 includes the rectifier 180, a charging relay (CHR) 170, the electrical storage device 190, a system main relay (SMR) 115, a power control unit (PCU) 120, a motor generator 130, a power transmission gear 140, drive wheels 150, a vehicle electronic control unit (ECU) 300 that serves as a control unit, a current sensor 171 and a voltage sensor 172 in addition to the power receiving unit 110 and the communication unit 160. The power receiving unit 110 includes a coil 111 (hereinafter, referred to as secondary self-resonance coil 111, and may be referred to as "resonance coil", or the like, where appropriate), a capacitor 112 and a secondary coil 113.

In the present embodiment, an electric vehicle is, for example, described as the vehicle 100; however, the configuration of the vehicle 100 is not limited to the electric vehicle as long as the vehicle is able to travel by using electric power stored in the electrical storage device. Another example of the vehicle 100 includes a hybrid vehicle equipped with an engine, a fuel cell vehicle equipped with a fuel cell, and the like.

The secondary self-resonance coil 111 receives electric power through electromagnetic resonance by using an electromagnetic field from a primary self-resonance coil 221 included in the power transmitting device 200.

The number of turns of the secondary self-resonance coil 111 and a distance from the secondary self-resonance coil 111 to the primary self-resonance coil 221 of the power transmitting device 200 are appropriately set on the basis of the distance to the primary self-resonance coil 221, the resonance frequency of the primary self-resonance coil 221 and secondary self-resonance coil 111, and the like, such that a Q value that indicates the resonance strength between the primary self-resonance coil 221 and the secondary self-resonance coil 111 increases (for example, Q>100) and the coupling coefficient κ that indicates the degree of coupling between the primary self-resonance coil 221 and the secondary self-resonance coil 111 reduces (for example, smaller than or equal to 0.3 and, desirably, smaller than or equal to 0.1).

The capacitor 112 is connected to both ends of the secondary self-resonance coil 111, and forms an LC resonance circuit together with the secondary self-resonance coil 111. The capacitance of the capacitor 112 is appropriately set on the basis of the inductance of the secondary self-resonance coil 111 such that a predetermined resonance frequency is obtained. When a desired resonance frequency is obtained by a stray capacitance of the secondary self-resonance coil 111 itself, the capacitor 112 may be omitted.

The secondary coil 113 is provided coaxially with the secondary self-resonance coil 111, and is able to be magnetically coupled to the secondary self-resonance coil 111 through electromagnetic induction. The secondary coil 113 extracts electric power, received by the secondary self-resonance coil 111, through electromagnetic induction and outputs the electric power to the rectifier 180.

The rectifier 180 rectifies alternating-current power received from the secondary coil 113, and outputs the rectified direct-current power to the electrical storage device 190 via the CHR 170. The rectifier 180 may be, for example, formed to include a diode bridge and a smoothing capacitor (both are not shown). The rectifier 180 may be a so-called switching regulator that rectifies alternating current using switching control; however, the rectifier 180 may be included in the power receiving unit 110, and, in order to prevent erroneous operation, or the like, of switching elements due to a generated electromagnetic field, the rectifier 180 is desirably a static rectifier, such as a diode bridge.

In the present embodiment, direct-current power rectified by the rectifier 180 is directly output to the electrical storage device 190; however, when a rectified direct-current voltage differs from a charging voltage that is allowed by the electrical storage device 190, a DC/DC converter (not shown) for voltage conversion may be provided between the rectifier 180 and the electrical storage device 190.

A load resistor 173 and a relay 174 that are serially connected for position detection are connected to an output portion of the rectifier 180. Before full-scale charging is started, a small electric power is transmitted from the power transmitting device 200 to the vehicle as a test signal. At this time, the relay 174 is controlled by a control signal SE3 from the vehicle ECU 300, and is set to a conductive state.

The voltage sensor 172 is provided between a pair of power lines that connect the rectifier 180 to the electrical storage device 190. The voltage sensor 172 detects a secondary-side direct-current voltage of the rectifier 180, that is, a received voltage received from the power transmitting device 200, and then outputs the detected value VC to the vehicle ECU 300. The vehicle ECU 300 determines a power receiving efficiency on the basis of the voltage VC, and transmits information about the power receiving efficiency to the power transmitting device 200 via the communication unit 160.

The current sensor 171 is provided in one of the power lines that connect the rectifier 180 to the electrical storage device 190. The current sensor 171 detects a charging current for charging the electrical storage device 190, and outputs the detected value IC to the vehicle ECU 300.

The CHR 170 is electrically connected to the rectifier 180 and the electrical storage device 190. The CHR 170 is controlled by a control signal SE2 from the vehicle ECU 300, and switches between supply and interruption of electric power from the rectifier 180 to the electrical storage device 190.

The electrical storage device 190 is an electric power storage element that is configured to be chargeable and dischargeable. The electrical storage device 190 is, for example, formed of a secondary battery, such as a lithium ion battery, a nickel-metal hydride battery and a lead-acid battery, or an electrical storage element, such as an electric double layer capacitor.

The electrical storage device 190 is connected to the rectifier 180 via the CHR 170. The electrical storage device 190 stores electric power that is received by the power receiving unit 110 and rectified by the rectifier 180. In addition, the electrical storage device 190 is also connected to the PCU 120 via the SMR 115. The electrical storage device 190 supplies electric power for generating vehicle driving force to the PCU 120. Furthermore, the electrical storage device 190 stores electric power generated by the motor generator 130. The output of the electrical storage device 190 is, for example, about 200 V.

A voltage sensor and a current sensor (both are not shown) are provided for the electrical storage device 190. The voltage sensor is used to detect the voltage VB of the electrical storage device 190. The current sensor is used to detect a current IB input to or output from the electrical storage device 190. These detected values are output to the vehicle ECU 300. The vehicle ECU 300 computes the state of charge (also referred to as "SOC") of the electrical storage device 190 on the basis of the voltage VB and the current IB.

The SMR 115 is inserted in power lines that connect the electrical storage device 190 to the-PCU 120. Then, the SMR 115 is controlled by a control signal SE1 from the vehicle ECU 300, and switches between supply and interruption of electric power between the electrical storage device 190 and the PCU 120.

The PCU 120 includes a converter and an inverter (both are not shown). The converter is controlled by a control signal PWC from the vehicle ECU 300, and converts voltage from the electrical storage device 190. The inverter is controlled by a control signal PWI from the vehicle ECU 300, and drives the motor generator 130 by using electric power converted by the converter.

The motor generator 130 is an alternating-current rotating electrical machine, and is, for example, a permanent-magnet synchronous motor that includes a rotor in which a permanent magnet is embedded.

The output torque of the motor generator 130 is transmitted to the drive wheels 150 via the power transmission gear 140 to drive the vehicle 100. The motor generator 130 is able to generate electric power by using the rotational force of the drive wheels 150 during regenerative braking operation of the vehicle 100. Then, the generated electric power is converted by the PCU 120 to charging electric power to charge the electrical storage device 190.

In addition, in a hybrid vehicle equipped with an engine (not shown) in addition to the motor generator 130, the engine and the motor generator 130 are cooperatively operated to generate required vehicle driving force. In this case, the electrical storage device 190 may be charged with electric power generated from the rotation of the engine.

As described above, the communication unit 160 is a communication interface for carrying out wireless communication between the vehicle 100 and the power transmitting device 200. The communication unit 160 outputs battery information INFO about the electrical storage device 190, including the SOC, from the vehicle ECU 300 to the power transmitting device 200. In addition, the communication unit 160 outputs a signal STRT or a signal STP, which instructs the power transmitting device 200 to start or stop transmission of electric power, to the power transmitting device 200.

The vehicle ECU 300 includes a central processing unit (CPU), a storage unit and an input/output buffer, which are not shown in FIG. 7. The ECU 300 inputs signals from the sensors, and the like, outputs control signals to the devices, and controls the vehicle 100 and the devices. Note that control over the vehicle 100 and the devices are not only limited to processing by software but may also be processed by exclusive hardware (electronic circuit).

When the vehicle ECU 300 receives a charging start signal TRG through user's operation, or the like, the vehicle ECU 300 outputs the signal STRT for instructions to start transmission of electric power to the power transmitting device 200 via the communication unit 160 on the basis of the fact that a predetermined condition is satisfied. In addition, the vehicle ECU 300 outputs the signal STP for instructions to stop transmission of electric power to the power transmitting device 200 via the communication unit 160 on the basis of the fact that the electrical storage device 190 is fully charged, user's operation, or the like.

The power transmitting device 200 includes a charging station 210 and the power transmitting unit 220. The charging station 210 further includes a power transmitting ECU 240 that serves as a control unit, a power supply unit 250, a display unit 242 and a fee reception unit 246 in addition to the communication unit 230. In addition, the power transmitting unit 220 includes the coil 221 (hereinafter, referred to as primary self-resonance coil 221, and may be referred to as "resonance coil", or the like, where appropriate), a capacitor 222 and a primary coil 223.

The power supply unit 250 is controlled by a control signal MOD from the power transmitting ECU 240, and converts electric power, received from the alternating-current power supply, such as a commercial power supply, to high-frequency electric power. Then, the power supply unit 250 supplies the converted high-frequency electric power to the primary coil 223.

Although a matching transformer for impedance conversion is not shown in FIG. 7; however, a matching transformer may be provided between the power supply unit 250 and the power transmitting unit 220 or between the power receiving unit 110 and the rectifier 180.

The primary self-resonance coil 221 transfers electric power to the secondary self-resonance coil 111, included in the power receiving unit 110 of the vehicle 100, through electromagnetic resonance.

The number of turns of the primary self-resonance coil 221 and a distance from the primary self-resonance coil 221 to the secondary self-resonance coil 111 of the vehicle 100 may be appropriately set on the basis of the distance to the secondary self-resonance coil 111, the resonance frequency between the primary self-resonance coil 221 and the secondary self-resonance coil 111, and the like, such that the Q value that indicates the resonance strength between the primary self-resonance coil 221 and the secondary self-resonance coil 111 increases. (for example, Q>100) and the coupling coefficient κ that indicates the degree of coupling between the primary self-resonance coil 221 and the secondary self-resonance coil 111 reduces. The coupling coefficient κ is, for example, lower than or equal to 0.3, and is desirably smaller than or equal to 0.1. Of course, the coupling coefficient κ that ranges from about 0.1 to 0.3 may also be employed. The coupling coefficient κ is not limited to such values; it may be various values at which power transfer is good.

The capacitor 222 is-connected to both ends of the primary self-resonance coil 221, and forms an LC resonance circuit together with the primary self-resonance coil 221. The capacitance of the capacitor 222 is appropriately set so as to attain a predetermined resonance frequency on the basis of the inductance of the primary self-resonance coil 221. When a desired resonance frequency is obtained by a stray capacitance of the primary self-resonance coil 221 itself, the capacitor 222 may be omitted.

The primary coil 223 is provided coaxially with the primary self-resonance coil 221, and is able to be magnetically coupled to the primary self-resonance coil 221 through electromagnetic induction. The primary coil 223 transmits high-frequency electric power, supplied through the matching transformer 260, to the primary self-resonance coil 221 through electromagnetic induction.

As described above, the communication unit 230 is a communication interface for carrying out wireless communication between the power transmitting device 200 and the vehicle 100. The communication unit 230 receives the battery information INFO and the signal STRT or signal STP for instructions to start or stop transmission of electric power, transmitted from the communication unit 160 of the vehicle 100, and outputs these pieces of information to the power transmitting ECU 240.

Cash, a prepaid card, a credit card, or the like, is inserted into the fee reception unit 246 in advance of charging. The power transmitting ECU 240 causes the power supply unit 250 to transmit a test signal by using a small electric power. Here, the "small electric power" is an electric power smaller than a charging electric power for charging the battery after authentication or an electric power that is transmitted at the time of position alignment, and may include an electric power that is transmitted intermittently.

The vehicle ECU 300 transmits the control signal SE2 and the control signal SE3 such that the relay 174 is turned on and the CHR 170 is turned off in order to receive the test signal. Then, the vehicle ECU 300 calculates a power receiving efficiency and a charging efficiency on the basis of the voltage VC. The vehicle ECU 300 transmits the calculated charging efficiency or power receiving efficiency to the power transmitting device 200 by the communication unit 160.

The display unit 242 of the power transmitting device 200 shows the charging efficiency or a charging electric power unit price corresponding to the charging efficiency to a user. The display unit 242 may have a function as an input unit, such as a touch panel, and is able to accept user's input for whether to approve the charging electric power unit price.

The power transmitting ECU 240 causes the power supply unit 250 to start full-scale charging when the charging electric power unit price is approved. When charging has been completed, a fee is paid at the fee reception unit 246.

The power transmitting ECU 240 includes a CPU, a storage device and an input/output buffer (which are not shown in FIG. 7). The power transmitting ECU 240 receives signals from sensors, or the like, and outputs control signals to various devices to thereby control various devices in the charging station 210. Note that control over the vehicle 100 and the devices are not only limited to processing by software but may also be processed by exclusive hardware (electronic circuit).

Power transfer from the power transmitting device 200 to the vehicle 100 satisfies the relationship between the power transmitting unit 90 and the power receiving unit 91 that are illustrated in FIG. 3 and FIG. 4. In the power transfer system shown in FIG. 7, the difference between the natural frequency of the power transmitting unit 220 and the natural frequency of the power receiving unit 110 is smaller than or equal to ±10% of the natural frequency of one of the power transmitting unit 220 and the power receiving unit 110. By setting the natural frequency of each of the power transmitting unit 220 and the power receiving unit 110 within the above range, it is possible to increase the power transfer efficiency. On the other hand, when the above-described difference in natural frequency is larger than ±10%, the power transfer efficiency becomes lower than 10%, so there occurs an inconvenience, such as an increase in power transfer time.

The vehicle 100 further communicates with the power transmitting device 200, and includes a display unit 142 that shows a determination result as to whether the power transmitting unit 220 is compatible with the power receiving unit 110 of the vehicle 100.

Figure 8:
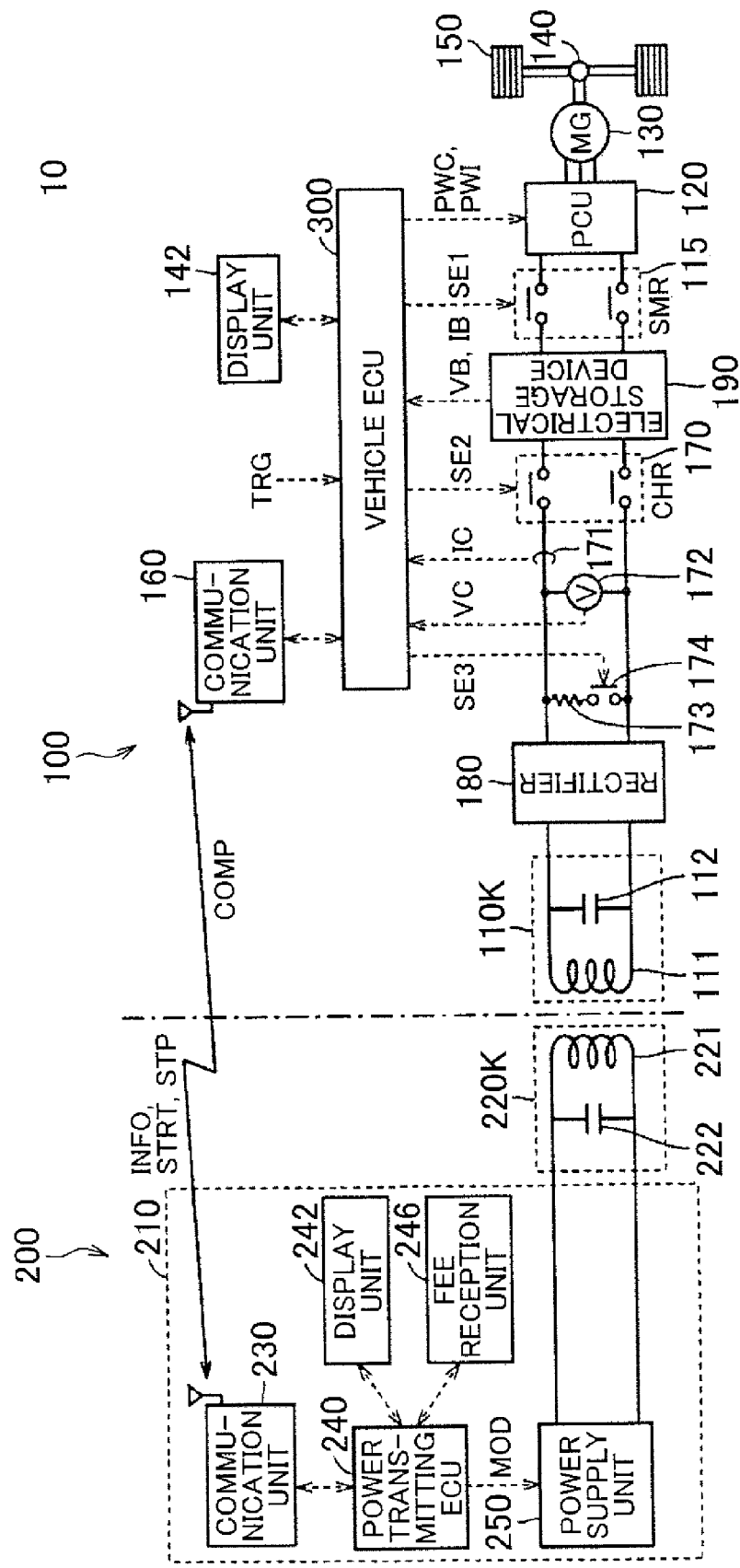
FIG. 8 is a view that shows a power transmitting unit and a power receiving unit according to an alternative embodiment to the power transfer system shown in FIG. 7.

FIG. 8 is a view that shows a power transmitting unit and a power receiving unit according to an alternative embodiment. As shown in FIG. 8, the electromagnetic induction coils 113, 223 shown in FIG. 7 may not be interposed. In the configuration shown in FIG. 8, a power transmitting unit 220K is provided at the power transmitting device 200, and a power receiving unit 110K is provided at the vehicle 100.

The power transmitting unit 220K includes the self-resonance coil 221 and the capacitor 222. The self-resonance coil 221 is connected to the power supply unit 250. The capacitor 222 is connected to the power supply unit 250 in parallel with the self-resonance coil 221.

The power receiving unit 110K includes the self-resonance coil 111 and the capacitor 112. The self-resonance coil 111 is connected to the rectifier 180. The capacitor 112 is connected to the rectifier 180 in parallel with the self-resonance coil 111.

The configuration of the other portions shown in FIGS is the same as the configuration illustrated in FIG. 7, so the description is not repeated.

Next, the coil type of each of the power transmitting unit and the power receiving unit will be described. The coil type of each of the power transmitting unit and the power receiving unit is typically a circular type or central type (circular coil type) in which magnetic fluxes pass through the center of a coil and a polarized type (polarized coil type) in which magnetic fluxes pass from one end of a coil to the other end of the coil. The polarized type is further classified into a longitudinally-oriented polarized type and a laterally-oriented polarized type depending on whether a direction in which magnetic fluxes pass is the longitudinal direction or lateral direction of a vehicle. A polarized coil may also be called solenoid coil.

Figure 9:
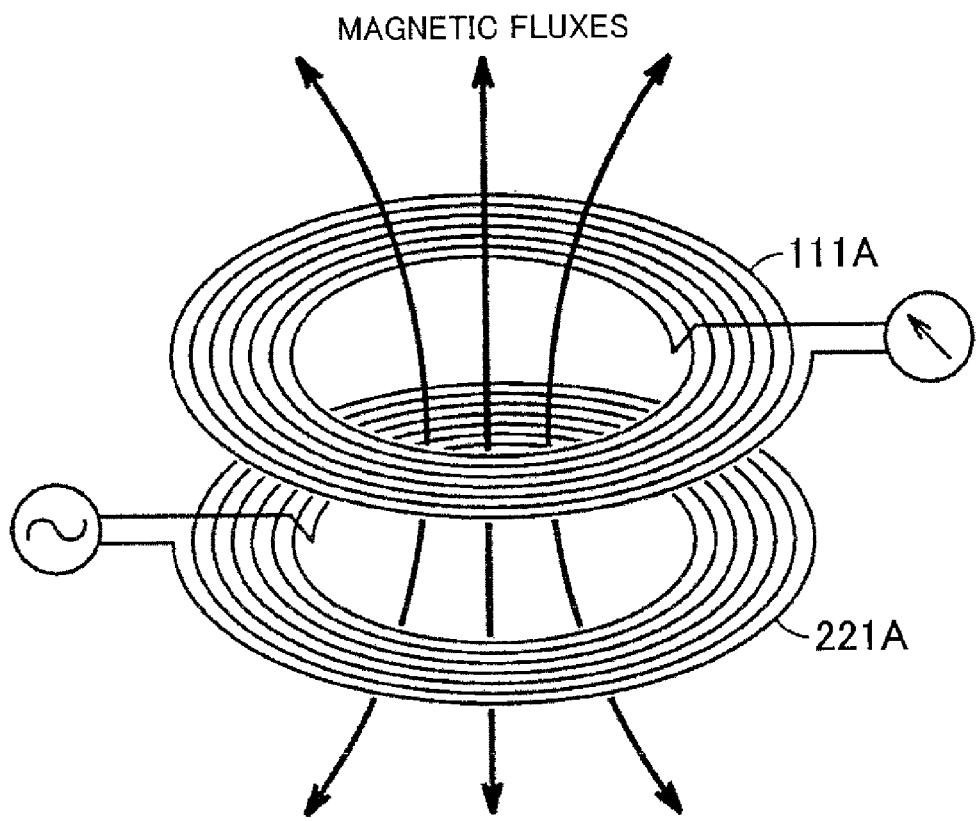
FIG. 9 is a view for illustrating circular coil units.

FIG. 9 is a view for illustrating circular coil units. As shown in FIG. 9, in the circular coil units, a power transmitting unit includes a power transmitting coil 221A, and a power receiving unit includes a power receiving coil 111 A.

Figure 10:
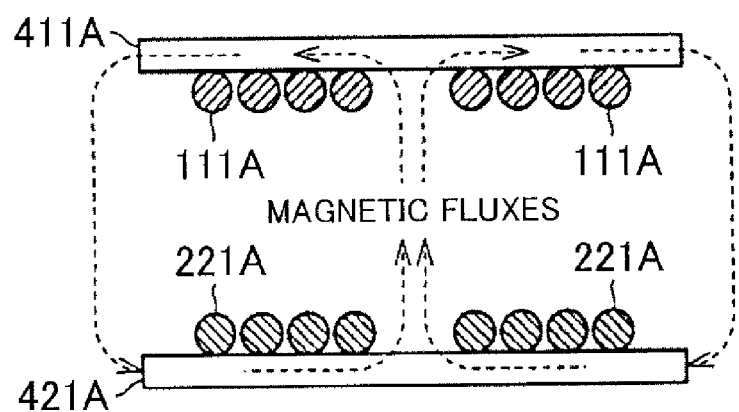
FIG. 10 is a view for illustrating a passage path of magnetic fluxes in the circular coil units.

FIG. 10 is a view for illustrating a passage path of magnetic fluxes in the circular coil units. As shown in FIG. 9 and FIG. 10, in the circular coil units, magnetic fluxes pass through the center portion of the circular coils. A hollow portion that is located near the center of the outer shape circle of each circular coil and that has no winding wire is termed center portion. Magnetic fluxes that have passed from the center portion of the power transmitting coil 221A to the center portion of the power receiving coil 111 A pass through the inside of a magnetic material 411 A toward the outside, returns around the outside of the coil winding wires, pass through the inside of a magnetic material 421A toward the center portion, and return to the center portion of the power transmitting coil 221A. Alternating current flows in the power transmitting unit, so the direction of magnetic fluxes is inverted when the direction of current flowing through the coil is inverted.

Figure 11:
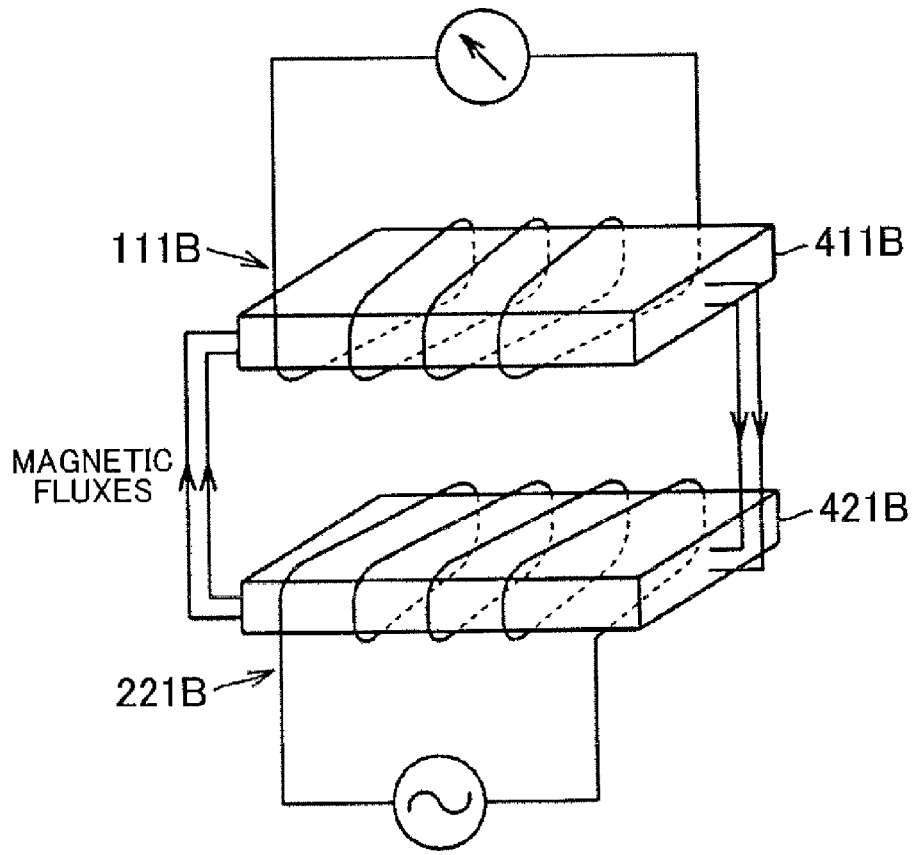
FIG. 11 is a view for illustrating polarized coil units.

FIG. 11 is a view for illustrating polarized coil units. As shown in FIG. 11, in the polarized coil units, a power transmitting unit includes a power transmitting coil 221B, and a power receiving unit includes a power receiving coil 111B. The power transmitting coil 221B is wound around a sheet-shaped magnetic material 421B. The power receiving coil 111B is wound around a sheet-shaped magnetic material 411B.

Figure 12:
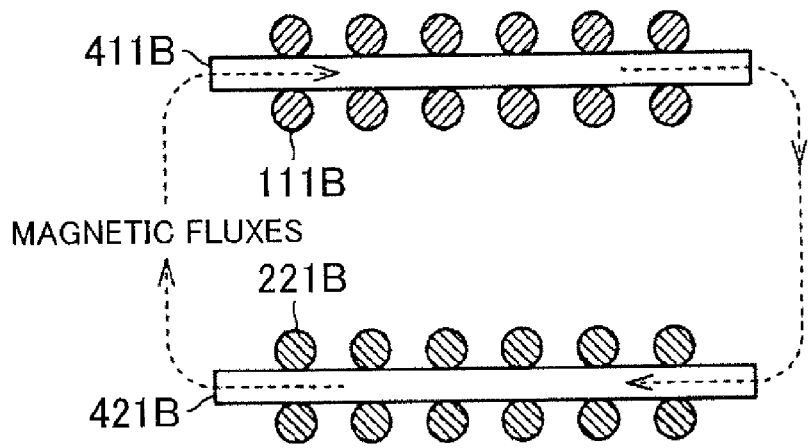
FIG. 12 is a view for illustrating a passage path of magnetic fluxes in the polarized coil units.

FIG. 12 is a view for illustrating a passage path of magnetic fluxes in the polarized coil units. As shown in FIG. 11 and FIG. 12, in the polarized coil units, magnetic fluxes pass through the center portion of each coil wound around the corresponding magnetic material (the inside of the corresponding magnetic material). Magnetic fluxes that have passed through the inside of the magnetic material 421 B from one end of the power transmitting coil 221B toward the other end of the power transmitting coil 221B travel to one end of the power receiving coil 111B, pass through the inside of the magnetic material 411B from the one end of the power receiving coil 111B toward the other end of the power receiving coil 111B and return to the one end of the power transmitting coil 221B. Alternating current flows in the power transmitting unit, so the direction of magnetic fluxes is inverted when the direction of current flowing through the coil is inverted.

When the polarized-type power transmitting coil 221B and the polarized-type power receiving coil 111B are respectively arranged at the position of the power transmitting unit 220 shown in FIG. 1 and the position of the power receiving unit 110 shown in FIG. 1, the direction in which magnetic fluxes pass through the coils is different from that of the circular coil units, and may be set to a vehicle longitudinal direction or a vehicle lateral direction (vehicle width direction).

Figure 13:
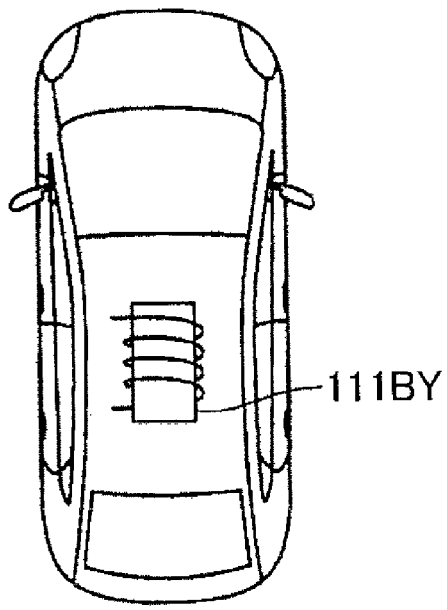
FIG. 13 is a view for illustrating a longitudinally-oriented polarized coil unit.

FIG. 13 is a view for illustrating a longitudinally-oriented polarized coil unit. As shown in FIG. 13, a longitudinally-oriented polarized-type power receiving coil 111BY is arranged in a vehicle such that the direction of passage of magnetic fluxes is the longitudinal direction of the vehicle. In other words, the power receiving coil 111BY is arranged in the vehicle such that the coil winding axis direction is the longitudinal direction of the vehicle.

Figure 14:
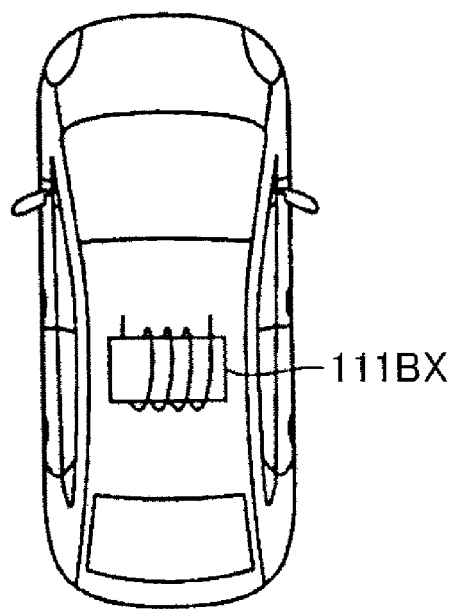
FIG. 14 is a view for illustrating a laterally-oriented polarized coil unit.

FIG. 14 is a view for illustrating a laterally-oriented polarized coil unit. As shown in FIG. 14, a laterally-oriented polarized-type power receiving coil 111BX is arranged in a vehicle such that the direction of passage of magnetic fluxes is the lateral direction of the vehicle (vehicle width direction). In other words, the power receiving coil 111BY is arranged in the vehicle such that the coil winding axis direction is the lateral direction of the vehicle.

The description is made on the example in which the polarized coil unit is arranged in the vehicle 100 with reference to FIG. 13 and FIG. 14. In the power transmitting device as well, the polarized coil unit may be classified into a longitudinally-oriented polarized coil unit and a laterally-oriented polarized coil unit depending on whether the direction of passage of magnetic fluxes is the longitudinal direction or the lateral direction of the vehicle parked.

Details of Communication between Power Transmitting Device and Power Receiving Device First Embodiment FIG. 15 is a view for illustrating the operation of a contactless power transfer system according to a first embodiment.

As shown in FIG. 15, a vehicle 100A is a vehicle in which the circular-type power receiving coil 111A is installed. A vehicle 100B is a vehicle in which the polarized-type power receiving coil 111B is installed.

Each of the vehicles 100A, 100B transmits a message M1 to the communication unit 230 of the power transmitting device. The message M1 includes information about whether the type of the coil unit installed in the host vehicle is the circular type, the longitudinally-oriented polarized type or the laterally-oriented polarized type. The information that indicates each of coil types, that is, the circular type, the longitudinally-oriented polarized type and the laterally-oriented polarized type, is an example of information that indicates a magnetic flux passage characteristic that expresses how magnetic fluxes pass in the coil unit. Information to be transmitted may be expressed in another format as long as it is information that indicates the magnetic flux passage characteristic.

It is determined whether each vehicle is chargeable by a charging infrastructure on the basis of the message M1 transmitted from the corresponding vehicle, and a message M2 that indicates the determination result is returned to the corresponding vehicle.

By receiving the message M2 and then showing whether it is chargeable on the display unit, a user is allowed to recognize whether the vehicle is chargeable at the charging facility without parking the vehicle at a parking position. Thus, it is convenient at the time when the user determines whether to utilize the charging facility.

At this time, in the first embodiment, the power transmitting device selects a parking position that is appropriate for the coil type of the power receiving unit installed in the vehicle, and provides information about the selected parking position to the vehicle, thus guiding the vehicle.

Figure 16A:
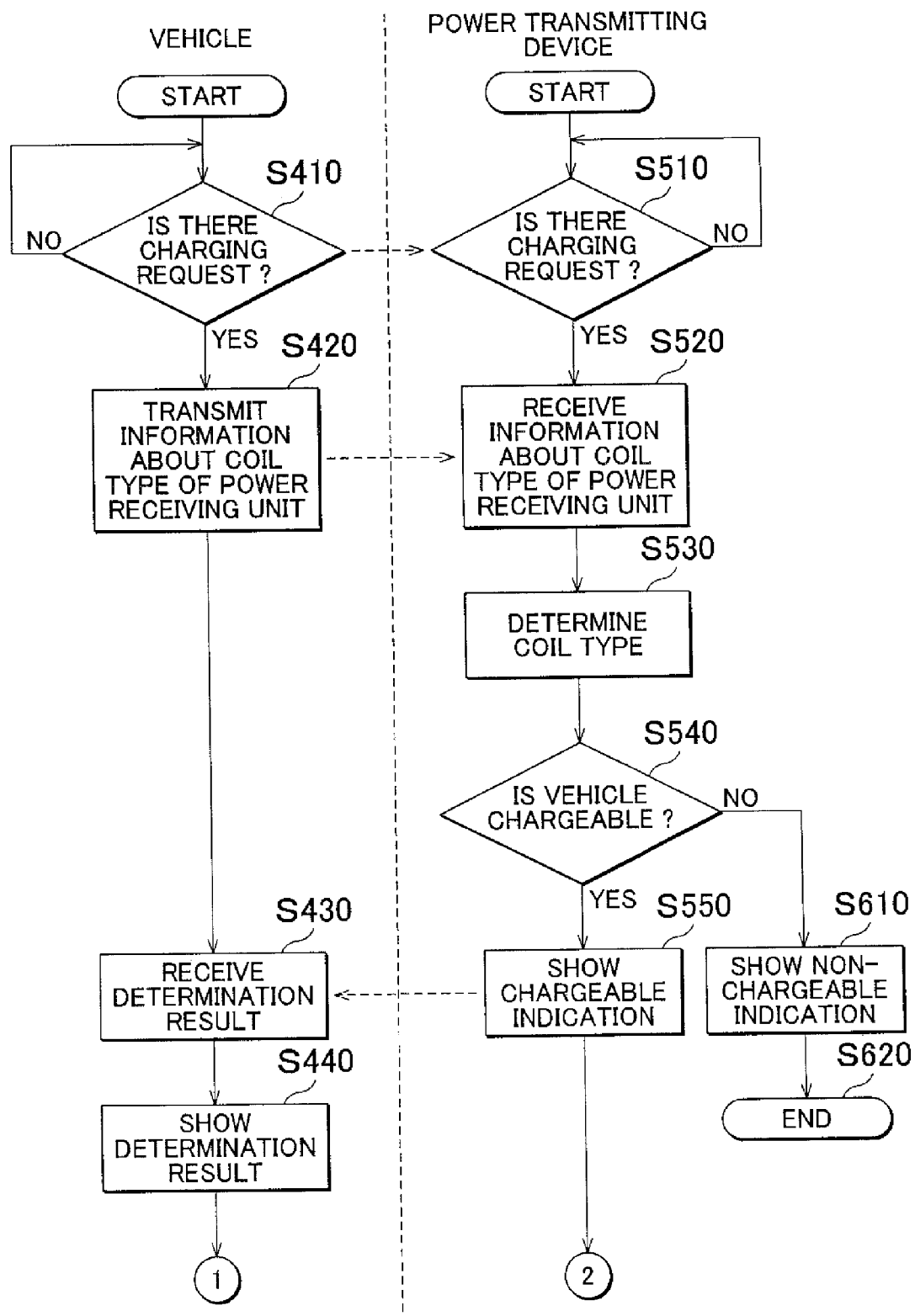
FIG. 16A and FIG. 16B are flowcharts for illustrating control that is executed in a vehicle and a power transmitting device in the first embodiment.
Figure 16B:
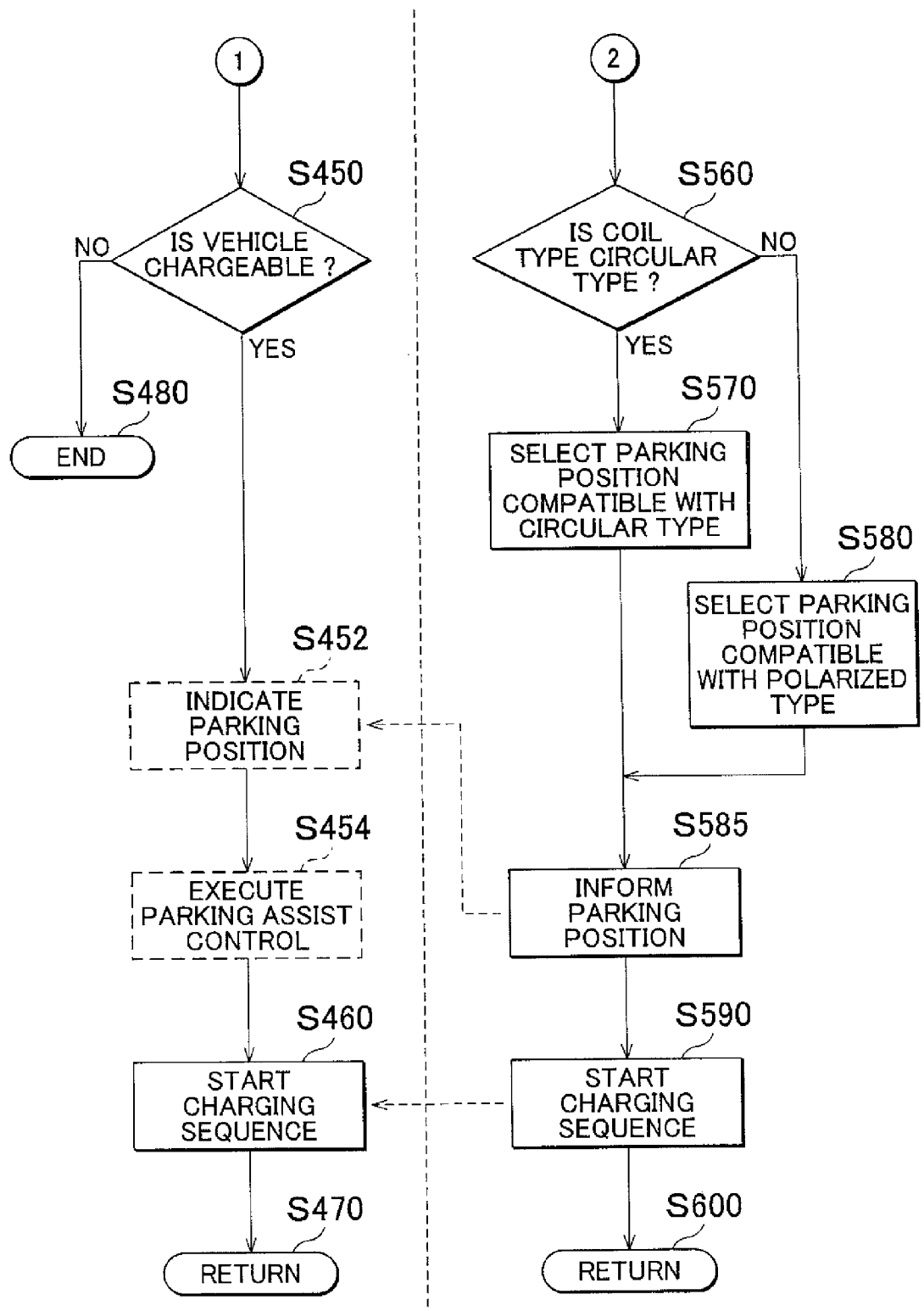

FIG. 16A and FIG. 16B are flowcharts for illustrating control that is executed in the vehicle and the power transmitting device in the first embodiment.

As shown in FIG. 7 and FIG. 16A, in the vehicle 100, in step S410, it is monitored by the vehicle ECU 300 whether there is a charging request. When input of the charging start signal TRG through user's operation, or the like, has been detected, the vehicle ECU 300 transmits the fact that there is a charging request to the power transmitting device 200 via the communication unit 160. Then, the process proceeds from step S410 to step S420.

On the other hand, in the power transmitting device 200, in step S510, it is monitored by the power transmitting ECU 240 whether there is a charging request. When the information about the fact that there is a charging request is transmitted from the communication unit 160 of the vehicle 100, and the power transmitting ECU 240 detects the charging request via the communication unit 230, the process proceeds from step S510 to step S520.

In the vehicle 100, in step S420, information about the coil type of the power receiving unit 110 is transmitted toward the power transmitting device 200 by the communication unit 160. In the power transmitting device 200, in step S520, the information about the coil type of the power receiving unit 110 is received by the communication unit 230, and the coil type of the power transmitting unit 220 is determined in step S530. The information about the coil type, for example, includes information about whether the coil is the circular type, the polarized type, the longitudinally-oriented polarized type or the laterally-oriented polarized type.

Furthermore, in step S540, the power transmitting ECU 240 determines whether the coil type of the power receiving unit 110 is compatible with the coil type that is configurable by the power transmitting unit 220 on the basis of the information about the coil type of the power receiving unit 110, received in step S520. When the coil type is compatible, it is determined that the vehicle is chargeable; whereas, when the coil type is not compatible, it is determined that the vehicle is not chargeable.

When the coil type is not compatible in step S540, the process proceeds to step S610, the power transmitting ECU 240 fixes the non-chargeable determination, causes the display unit 242 to show non-chargeable indication, and transmits the determination result to the vehicle 100. The process at the power transmitting device 200 side ends in step S620.

On the other hand, when the coil type is compatible in step S540, that is, when the power transmitting coil that is compatible with the coil type of the vehicle is selectable, the process proceeds to step S550, the power transmitting ECU 240 fixes the chargeable determination, causes the display unit 242 to show the determination result, and transmits the determination result to the vehicle 100.

In the vehicle 100, the determination result is received by the communication unit 160 in step S430, and the vehicle ECU 300 causes the display unit 142, such as a liquid crystal display, to show the determination result in step S440. The determination result may be provided to a driver by voice instead of indication on the display unit 142.

In the power transmitting device 200, after the chargeable indication has been made in step S550, it is determined in step S560 whether the coil type of the vehicle 100 is the circular type. When it is determined in step S550 that the coil type is the circular type, the process proceeds to step S570, and the power transmitting ECU 240 selects a parking position (target position) that is compatible with the circular type.

When it is determined in step S560 that the coil type is not the circular type, the process proceeds to step S580, and the power transmitting ECU 240 selects a parking position (target position) that is compatible with the polarized type.

In process from step S560 to step S585, it may be further determined whether the coil type is the longitudinally-oriented polarized type or the laterally-oriented polarized type, and a corresponding parking position (target position) may be selected.

After the parking position has been selected in step S570 or step S580, the process proceeds to step S585, and the parking position is informed to the user. For example, in order to inform the parking position to the user, a parking frame may be illuminated or information that indicates the parking position may be transmitted to the vehicle.

Subsequently, in step S590, the power transmitting ECU 240 starts a charging sequence for charging the vehicle, and the process proceeds to a charging process routine in step S600.

In the vehicle, in step S450, it is determined whether the vehicle is chargeable on the basis of the result of determination as to whether it is chargeable from the power transmitting device. When the vehicle is not chargeable in step S450, the process proceeds to step S480, and the charging process at the vehicle side ends.

When information that indicates the parking position is transmitted to the vehicle in step S585, the vehicle shows a frame, or the like, indicating the parking position on the display unit 142 on the basis of the information received in step S452. Furthermore, as shown in step S454, parking assist control for parking the vehicle at the target parking position may be executed. Parking assist control may be configured to completely automatically move the vehicle or may be configured such that steering operation is automatically carried out and the user instructs a forward or reverse speed with the use of an accelerator pedal, or the like. In addition, parking assist control may be configured such that a steering operation amount is indicated on a screen, or the like, and the user manually conducts steering operation.

After the parking position is fixed, the process proceeds to step S460. In synchronization with the start of charging sequence in step S590, communication about the fact that the start of charging is instructed is carried out with the vehicle side, and the charging sequence is started in step S460 at the vehicle side. Then, the process proceeds to the charging process routine in step S470.

Figure 17:
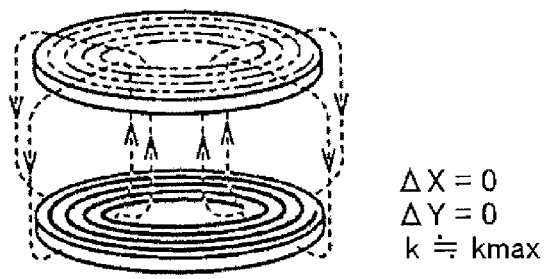
FIG. 17 is a view for illustrating a positional deviation amount in the case where the power transmitting unit and the power receiving unit each include a circular coil.
Figure 18:
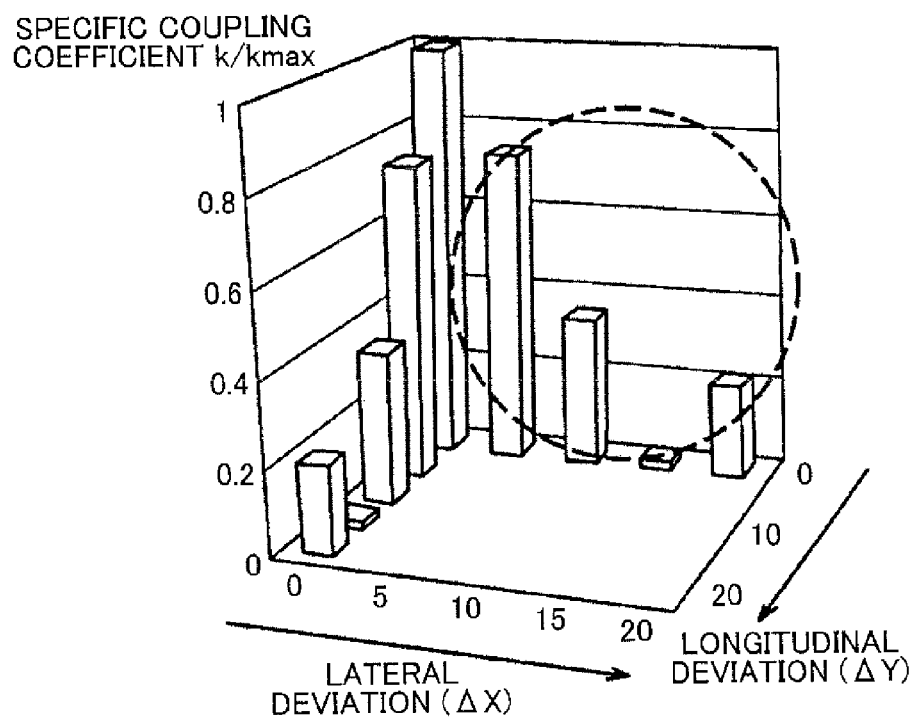
FIG. 18 is a graph that shows a variation in coupling coefficient κ against a longitudinal deviation and a lateral deviation in the case shown in FIG. 17.

Next, the parking position that is selected in step S570 or step S580 will be described in detail. FIG. 17 is a view for illustrating a positional deviation amount when the power transmitting unit and the power receiving unit each include the circular coil. FIG. 18 is a graph that shows a variation in a specific coupling coefficient κ/κmax against a longitudinal deviation and a lateral deviation in the case shown in FIG. 17. Hereinafter, in FIG. 18, FIG. 20 and FIG. 26, the coupling coefficient is denoted by k, and is used in the same meaning as κ. κmax or kmax is a coupling coefficient at the time when a positional deviation is zero in the case where the power transmitting unit and the power receiving unit each include the coil of the same type.

As shown in FIG. 17 and FIG. 18, in the case where the power transmitting unit and the power receiving unit each include the circular coil, the specific coupling coefficient κ/κmax is close to 1 when the lateral deviation amount (ΔX) is 0 and the longitudinal deviation amount (ΔY) is 0, and the power transfer efficiency becomes maximum. As shown in FIG. 18, the specific coupling coefficient κ/κmax reduces with an increase in the lateral deviation amount, and, at the time of an increase in the longitudinal deviation amount as well, the specific coupling coefficient κ/κmax reduces at the same rate of reduction as that when the lateral deviation amount increases.

That is, when the power transmitting unit and the power receiving unit each include the circular coil, there is almost no difference between the case where there is a lateral deviation and the case where there is a longitudinal deviation.

Figure 19:
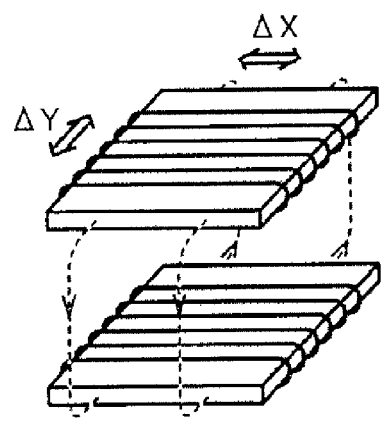
FIG. 19 is a view for illustrating a positional deviation amount in the case where the power transmitting unit and the power receiving unit each include a polarized coil.
Figure 20:
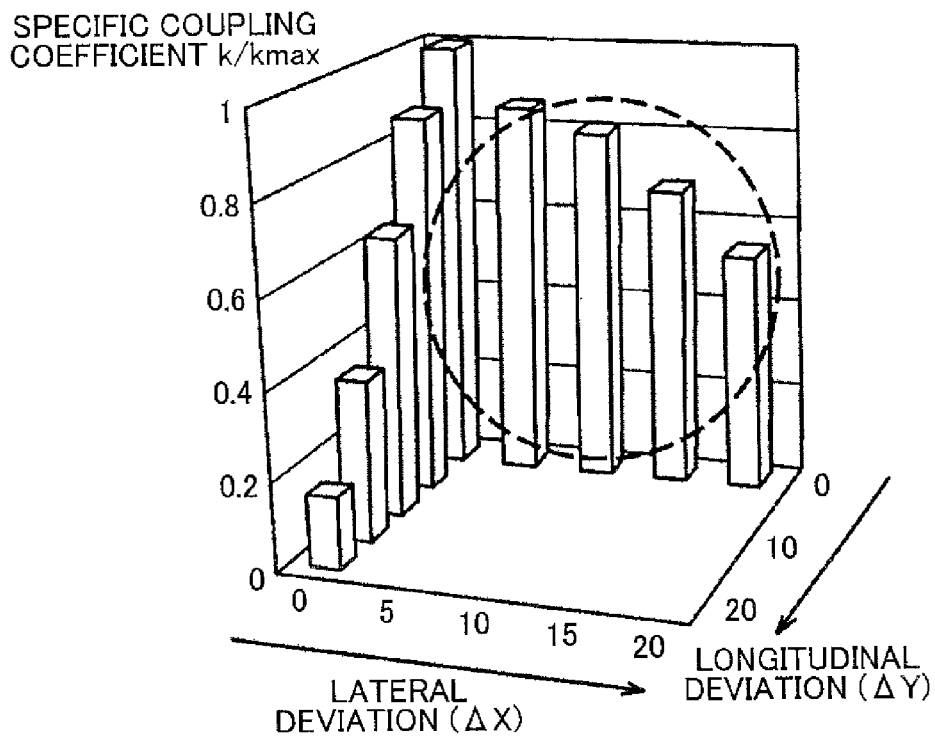
FIG. 20 is a graph that shows a variation in coupling coefficient κ against a longitudinal deviation and a lateral deviation in the case shown in FIG. 19.

FIG. 19 is a view for illustrating a positional deviation when the power transmitting unit and the power receiving unit each include the polarized coil. FIG. 20 is a graph that shows a variation in specific coupling coefficient κ/κmax against a longitudinal deviation and a lateral deviation in the case shown in FIG. 19.

As shown in FIG. 19 and FIG. 20, in the case where the power transmitting unit and the power receiving unit each include the polarized coil, the specific coupling coefficient κ/κmax is close to 1 when the lateral deviation amount (ΔX) is 0 and the longitudinal deviation amount (ΔY) is 0, and the power transfer efficiency becomes maximum. Then, as shown in FIG. 20, the specific coupling coefficient κ/κmax reduces with an increase in the longitudinal deviation amount. The specific coupling coefficient κ/κmax also reduces at the time when the lateral deviation increases; however, the amount of reduction in specific coupling coefficient κ/κmax is smaller than that at the time when the longitudinal deviation amount increases.

That is, in the case where the power transmitting unit and the power receiving unit each include the polarized coil, the degree of decrease in specific coupling coefficient κ/κmax is lower when there is a lateral deviation (ΔX direction in FIG. 19) than when there is a longitudinal deviation (ΔY direction in FIG. 19). That is, this configuration is tolerant of lateral deviation. In addition, when the circled portions respectively indicated by the broken lines in FIG. 18 and FIG. 20 are compared with each other, it appears that the pair of polarized coils are more tolerant of lateral deviation than the pair of circular coils.

Figure 21:
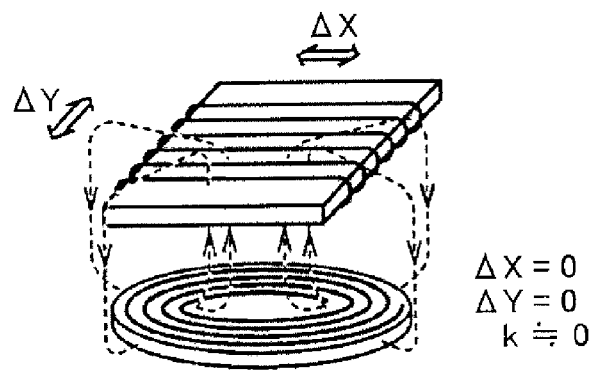
FIG. 21 is a view that shows a state where there is no positional deviation in the case of the coil types are different.

Next, description will be made on the case where the coil type of the power transmitting unit is different from the coil type of the power receiving unit. FIG. 21 is a view that shows a state where there is no positional deviation in the case where the coil types are different from each other.

Figure 22:
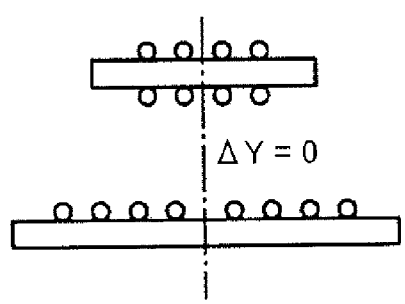
FIG. 22 is a cross-sectional view of the coil units, taken in ΔY direction, in the case shown in FIG. 21.

FIG. 22 is a cross-sectional view of the coil units, taken in ΔY direction, in the case shown in FIG. 21.

In FIG. 21 and FIG. 22, the lower-side unit is a circular coil unit, and the upper-side unit is a polarized coil unit. Then, when the longitudinal deviation ΔY=0 as shown in FIG. 21 and FIG. 22, magnetic coupling between the two coil units is weak. Magnetic fluxes from the lower-side circular coil unit attempt to pass upward through the coil center; however, the center portion of the upper-side polarized coil unit has such a form that does not allow magnetic fluxes to pass therethrough, so no magnetic circuit is formed.

Figure 23:
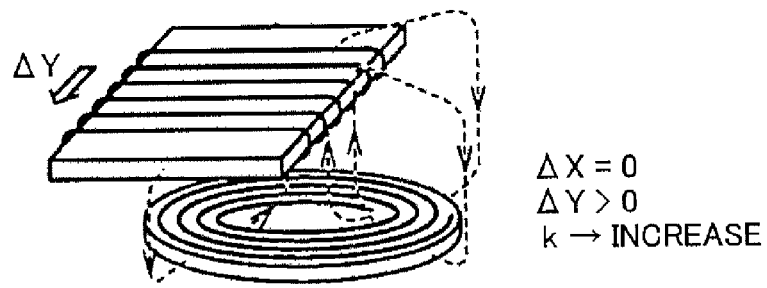
FIG. 23 is a view that shows a state where there is a longitudinal deviation in the case where the coil types are different.
Figure 24:
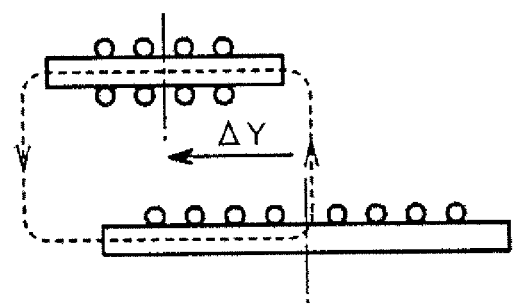
FIG. 24 is a cross-sectional view of the coil units, taken in ΔY direction, in the case shown in FIG. 23.

FIG. 23 is a view that shows a state where there is a longitudinal deviation in the case where the coil types are different from each other. FIG. 24 is a cross-sectional view of the coil units, taken in ΔY direction, in the case shown in FIG. 23. When the longitudinal deviation amount ΔY increases from 0 to a predetermined value, magnetic fluxes travel from the center portion of the circular coil unit to an end portion of the polarized coil unit as shown in FIG. 24, so magnetic fluxes are allowed to pass through the inside of a core of the polarized coil unit in the lateral direction of the sheet. Thus, a magnetic circuit shown by the broken arrows in FIG. 24 is formed. Therefore, the specific coupling coefficient κ/κmax between the two coil units increases until the longitudinal deviation amount ΔY becomes the predetermined value. When the longitudinal deviation amount ΔY exceeds the predetermined value, a variation in specific coupling coefficient κ/κmax against an increase in longitudinal deviation amount ΔY begins to reduce.

Figure 25:
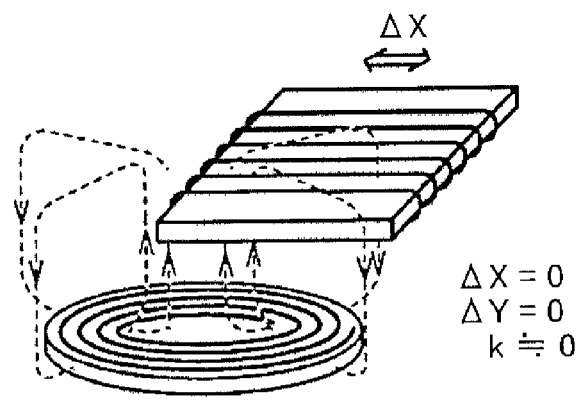
FIG. 25 is a view that shows a state where there is a lateral deviation in the case where the coil types are different.

FIG. 25 is a view that shows a state where there is a lateral deviation in the case where the coil types are different from each other. Even when the lateral deviation amount ΔX increases from 0, it seems to remain unchanged as the state shown in FIG. 22 when viewed laterally. That is, the two coil units remain in a state where magnetic coupling is not possible. Magnetic fluxes from the lower-side circular coil unit attempt to pass upward through the coil center; however, the center portion of the upper-side polarized coil unit has such a form that does not allow magnetic fluxes to pass therethrough, so no magnetic circuit is formed.

Figure 26:
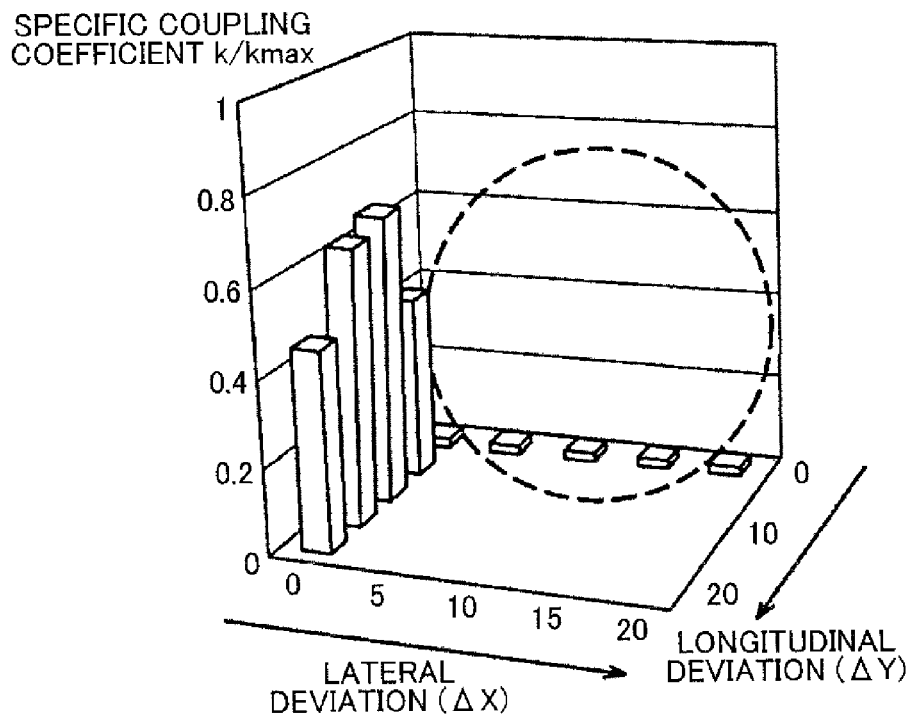
FIG. 26 is a graph that shows a variation in coupling coefficient κ against a longitudinal deviation and a lateral deviation in the case shown in FIG. 21, FIG. 22 and FIG. 25.

FIG. 26 is a graph that shows a variation in specific coupling coefficient κ/κmax against a longitudinal deviation and a lateral deviation in the case shown in FIG. 21, FIG. 22 and FIG. 25. As shown in FIG. 26, in the case where electric power is transferred with the use of the units having different coil types, for a longitudinal deviation, the specific coupling coefficient κ/κmax increases with an increase in longitudinal deviation amount from ΔY=0 to the predetermined value, and, once the longitudinal deviation amount ΔY exceeds the predetermined value, the specific coupling coefficient κ/κmax reduces with an increase in longitudinal deviation amount. Then, when the longitudinal deviation amount ΔY=0, even when the lateral deviation amount ΔX increases, the specific coupling coefficient κ/κmax remains zero. That is, it is not possible to supply electric power at the time of a lateral deviation.

Figure 27:
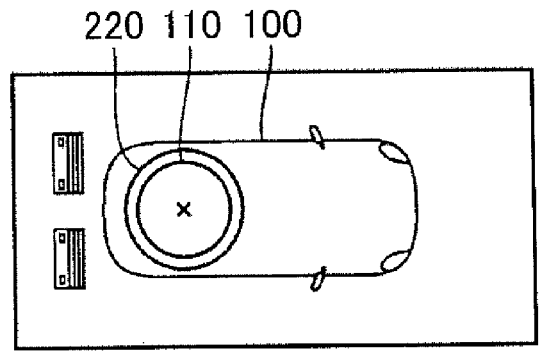
FIG. 27 is a view for illustrating a parking position (target position) in the case where the power transmitting unit and the power receiving unit each include a circular coil.

FIG. 27 is a view for illustrating a parking position (target position) in the case where the power transmitting unit and the power receiving unit each include the circular coil. The power transmitting unit 220 and the power receiving unit 110 each include the circular coil. In such a case, the parking position of the vehicle 100 is determined such that the centers of the coil units are brought into coincidence with each other.

Figure 28:
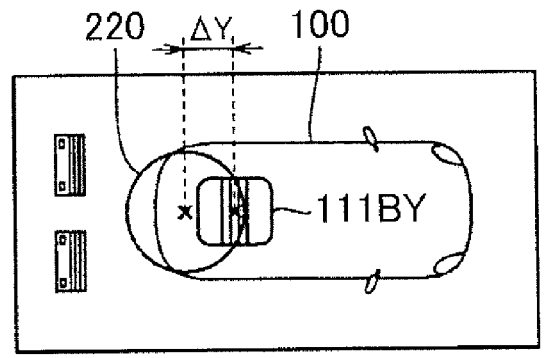
FIG. 28 is a view for illustrating a parking position (target position) in the case where the power transmitting unit includes a circular coil and the power receiving unit includes a longitudinally-oriented polarized coil.

FIG. 28 is a view for illustrating a parking position (target position) in the case where the power transmitting unit includes the circular coil and the power receiving unit includes the longitudinally-oriented polarized coil. The power transmitting unit 220 includes the circular coil. The power receiving unit 111BY includes the longitudinally-oriented polarized coil. In such a case, the parking position of the vehicle 100 is determined such that the centers of the coil units are set at positions that deviate by ΔY in the vehicle longitudinal direction. ΔY is a value that is determined on the basis of the coil types, sizes, and the like.

FIG. 29 is a view for illustrating a parking position (target position) in the case where the power transmitting unit includes the circular coil and the power receiving unit includes the laterally-oriented polarized coil. The power transmitting unit 220 includes the circular coil. The power receiving unit 111BX includes the laterally-oriented polarized coil. In such a case, the parking position of the vehicle 100 is determined such that the centers of the coil units are set at positions that deviate by ΔX in the vehicle longitudinal direction. ΔX is a value that is determined on the basis of the coil types, sizes, and the like.

By determining the parking position as shown in FIG. 28 and FIG. 29, the passage path of magnetic fluxes as shown in FIG. 24 is formed, the coupling coefficient κ increases, and the power transfer efficiency improves.

In FIG. 21 to FIG. 29, the description is made on the example in which the power transmitting unit is the circular coil unit and the power receiving unit is the polarized coil unit. Similarly, when the power transmitting unit is the polarized coil unit and the power receiving unit is the circular coil unit, the vehicle is parked with the positional deviation amount ΔX and the positional deviation amount ΔY set at certain values, it is possible to increase the power transmitting efficiency as compared with when there is no positional deviation.

In addition, in FIG. 21 to FIG. 29, the positional deviation is specified by a deviation amount in positional relationship between the center of the power receiving unit and the center of the power transmitting unit. In the case where the power receiving unit or the power transmitting unit is the circular type, the center of the outer shape circle of the coil wound in a circular shape may be regarded as the center of the power receiving unit or the power transmitting unit. In the case where the power receiving unit or the power transmitting unit is the polarized type, when a coil portion wound around a sheet-shaped plate is a rectangular shape, a portion around the intersection of the diagonal lines of the rectangular shape may be regarded as the center of the power receiving unit or the power transmitting unit. A positional deviation amount may be defined by a deviation between two reference points that are set other than the center.

In the first embodiment, the description is made on the power transmitting device that receives information about the coil structure, and the like, of the charging device of the vehicle through communication, determines the coil type of the charging device and then carries out any one of 1) determining a chargeable parking area, 2) clearly indicating a vehicle stop position to the user and 3) starting the charging sequence.

Thus, even when a vehicle in which any power receiving device is installed comes, it is possible to smoothly start charging, so the convenience of the user improves.

The first embodiment will be summarized again with reference to the drawings. As shown in FIG. 7 and FIG. 15, the contactless power transmitting device according to the first embodiment includes the power transmitting unit 220 that is configured to be able to contactlessly transmit electric power to the power receiving unit 110 installed in the power receiving device and a guide unit (power transmitting ECU 240) that is configured to change a guide position, to which the power receiving device is guided at the time when the power receiving device receives electric power, on the basis of the type of the power receiving unit 110.

As is executed in step S570 and step S580 in FIG. 16B, the guide unit (power transmitting ECU 240) may be configured to, in the case where the type of the power receiving unit 110 and the type of the power transmitting unit 220 are the same, set the position of the power receiving unit 110 (shown in FIG. 27), at which the center position of the power receiving unit 110 coincides with the center position of the power transmitting unit 220, for the guide position, and is configured to, in the case where the type of the power receiving unit 110 and the type of the power transmitting unit 220 are different, set the positions of the power receiving unit 111BX or power receiving unit 111BY (shown in FIG. 28 or FIG. 29), at which the center position of the power receiving unit 111BX or the power receiving unit 111BY deviates from the center position of the power transmitting unit 220, for the guide position.

The type of each of the power receiving unit 110 and the power transmitting unit 220 may be classified on the basis of the structure of components (the coil type, such as the circular type and the polarized type, the way of winding the coil, the shape and material of the core, and the like) of the power transmitting unit or power receiving unit, which influences a magnetic flux distribution that is generated in the power transmitting unit and the power receiving unit at the time of transmission of electric power.

The guide unit (power transmitting ECU 240) may be configured to, in the case where the type of the power receiving unit is the polarized type, determine the guide position in consideration of the orientation in which the power receiving unit 111BX or the power receiving unit 111BY is installed in the power receiving device as shown in FIG. 28 or FIG. 29.

The power receiving device may be a vehicle. The guide unit (power transmitting ECU 240) may be configured to inform the parking position, as the guide position, at the time when the vehicle receives electric power as shown in FIG. 27 to FIG. 29 to the user of the vehicle in step S585 in FIG. 16B.

The power receiving device may be a vehicle. The guide unit (power transmitting ECU 240) may be configured to inform the parking position, as vehicle parking assist, in step S585 in FIG. 16B such that the parking position at the time when the vehicle receives electric power as shown in FIG. 27 to FIG. 29 is determined.

The difference between the natural frequency of the power transmitting unit 220 and the natural frequency of the power receiving unit 110 may fall within the range of ±10%.

The coupling coefficient between the power receiving unit 110 and the power transmitting unit 220 may be smaller than or equal to 0.1.

The power transmitting unit 220 may be configured to transmit electric power to the power receiving unit 110 through at least one of a magnetic field that is formed between the power receiving unit 110 and the power transmitting unit 220 and that oscillates at a predetermined frequency and an electric field that is formed between the power receiving unit 110 and the power transmitting unit 220 and that oscillates at a predetermined frequency.

In the first embodiment, the description is made on the example in which the power transmitting device determines parking target position information and informs the driver of the parking target position information or transmits the parking target position information to the vehicle. The parking target position information may be determined at the vehicle.

Next, a second embodiment will be described. FIG. 30 is a view for illustrating the operation of a contactless power transfer system according to the second embodiment. As shown in FIG. 30, the vehicle 100A is a vehicle in which the circular-type power receiving coil 111A is installed. The vehicle 100B is a vehicle in which the polarized-type power receiving coil 111B is installed. At this time, it is assumed that the power transmitting unit 220 of any one of the circular type and the polarized type is installed in the power transmitting device 200 that is the charging infrastructure.

The communication unit 230 of the power transmitting device transmits a message M3 to the communication unit 160 of each of the vehicles 100A and 100B. The message M3 includes whether the type of the coil unit installed in the power transmitting device is the circular type, the longitudinally-oriented polarized type or the laterally-oriented polarized type. The information that indicates each of coil types, that is, the circular type, the longitudinally-oriented polarized type and the laterally-oriented polarized type, is an example of information that indicates a magnetic flux passage characteristic. Information to be transmitted may be expressed in another format as long as it is information that indicates the magnetic flux passage characteristic.

On the basis of the message M3 transmitted from the power transmitting device, the ECU of each of the vehicles 100A, 100B determines whether the corresponding vehicle is chargeable by the charging infrastructure, and shows the determination result to the vehicle user.

By showing whether the vehicle is chargeable on the display unit, the user is allowed to recognize whether the vehicle is chargeable at the charging facility even when the vehicle is not parked at a parking position. Thus, it is convenient at the time when the user determines whether to utilize the charging facility.

Then, the parking assist device installed in the vehicle adjusts the parking position of the vehicle and guides the vehicle to the parking position on the basis of the type of the coil unit. For example, the parking position may be adjusted as shown in FIG. 27 to FIG. 29.

Figure 31A:
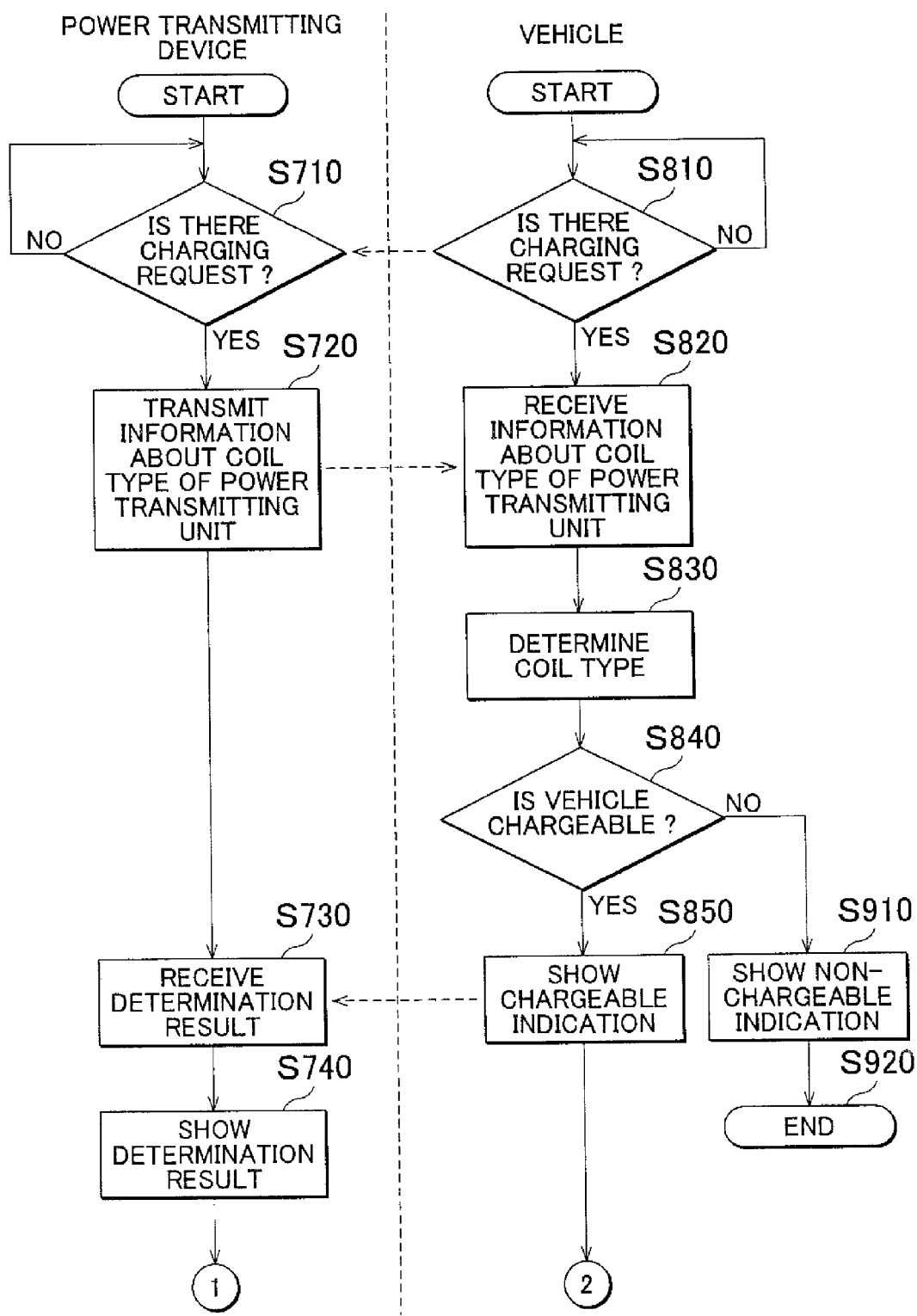
FIG. 31A and FIG. 31B are flowcharts for illustrating control that is executed in a vehicle and a power transmitting device in the second embodiment.

A message M4 as to whether to charge the vehicle may be returned to the charging infrastructure. FIG. 31A and FIG.

31B are flowcharts for illustrating control that is executed in the vehicle and the power transmitting device in the second embodiment.

As shown in FIG. 30 and FIG. 31A, in the vehicle 100, in step S810, it is monitored by the vehicle ECU 300 whether there is a charging request. When input of the charging start signal TRG through user's operation, or the like, has been detected, the vehicle ECU 300 transmits the fact that there is a charging request to the power transmitting device 200 via the communication unit 160. Then, the process proceeds from step S810 to step S820.

On the other hand, in the power transmitting device 200, in step S710, it is monitored by the power transmitting ECU 240 whether there is a charging request. When the information about the fact that there is a charging request is transmitted from the communication unit 160 of the vehicle 100, and the power transmitting ECU 240 detects the charging request via the communication unit 230, the process proceeds from step S710 to step S720.

In the power transmitting device 200, in step S720, information about the coil type of the power transmitting unit 220 is transmitted toward the vehicle 100 by the communication unit 230. In the vehicle 100, in step S820, the information about the coil type of the power transmitting unit 220 is received by the communication unit 160, and the coil type of the power transmitting unit 220 is determined in step S830. The information about the coil type, for example, includes information about whether the coil is the circular type, the polarized type, the longitudinally-oriented polarized type or the laterally-oriented polarized type.

Furthermore, in step S840, the vehicle ECU 300 determines whether the coil type of the power transmitting unit is compatible with the coil type that is configurable by the power receiving unit on the basis of the information about the coil type of the power transmitting unit received in step S820. When the coil type is compatible, it is determined that the vehicle is chargeable; whereas, when the coil type is not compatible, it is determined that the vehicle is not chargeable.

When the coil type is not compatible in step S840, the process proceeds to step S910, the vehicle ECU 300 fixes the non-chargeable determination, causes the display unit 142 to show non-chargeable determination, and transmits the determination result to the power transmitting device 200. The process at the vehicle side ends in step S920.

On the other hand, when the coil type is compatible in step S840, that is, when the power receiving coil that is compatible with the coil type of the power transmitting device is selectable, the process proceeds to step S850, the vehicle ECU 300 fixes the chargeable determination, causes the display unit 142 to show the determination result, and transmits the determination result to the power transmitting device 200.

In the power transmitting device 200, in step S730, the determination result is received by the communication unit 230, and, in step S740, the power transmitting ECU 240 causes the display unit 242, such as the liquid crystal display, to show the determination result. The determination result may be provided to a driver by voice instead of indication on the display unit 242.

In the vehicle 100, after the chargeable indication has been made in step S850, it is determined in step S860 whether the coil type of the power transmitting device 200 is the circular type. When it is determined in step S850 that the coil type is the circular type, the process proceeds to step S870, and the vehicle ECU 300 selects a parking position (target position) that is compatible with the circular type.

When it is determined in step S860 that the coil type is not the circular type, the process proceeds to step S880, and the vehicle ECU 300 selects a parking position (target position) that is compatible with the polarized type. In process from step S860 to step S880, it may be further determined whether the coil type of the power transmitting device 200 is the longitudinally-oriented polarized type or the laterally-oriented polarized type, and a corresponding configuration may be selected. The longitudinally-oriented type in this case means that the power transmitting coil is arranged in a parking space such that the direction in which magnetic fluxes pass through the power transmitting coil coincides with the direction of the parking space, which corresponds to the vehicle longitudinal direction. The laterally-oriented type in this case means that the power transmitting coil is arranged in a parking space such that the direction in which magnetic fluxes pass through the power transmitting coil coincides with the direction of the parking space, which corresponds to the vehicle lateral direction.

After the configuration of the coil has been selected in step S870 or step S880, the vehicle shows a frame, or the like, indicating the target parking position on the display unit 142 on the basis of the information received in step S882. For example, the parking frame may be automatically recognized from a white line, or the like, on a camera image, and a frame indicating the target parking position may be determined within the recognized parking frame. In this case, a parking frame may not be automatically recognized, and it may be set on a display screen with the use of arrow keys, or the like, while the user seeing a camera image, or the like.

Furthermore, as shown in step S884, parking assist control for parking the vehicle at the target parking position may be executed. Parking assist control may be configured to completely automatically move the vehicle or may be configured such that steering operation is automatically carried out and the user instructs a forward or reverse speed with the use of an accelerator pedal, or the like. In addition, parking assist control may be configured such that a steering operation amount is indicated on a screen, or the like, and the user manually conducts steering operation.

After the parking position is fixed, the process proceeds to step S890. In step S890, the vehicle ECU 300 starts a charging sequence for charging the vehicle, and the process proceeds to a charging process routine in step S900.

In the power transmitting device 200, in step S750, it is determined whether it is chargeable on the basis of the result of determination from the vehicle as to whether it is chargeable. When it is not chargeable in step S750, the process proceeds to step S780, and the charging process at the power transmitting device 200 ends.

When it is chargeable in step S750, the process proceeds to step S760. In synchronization with the start of charging sequence in step S890, communication about the fact that charging is started is carried out from the vehicle to the power transmitting device, and the charging sequence is started in step S760 at the power transmitting device side. Then, the process proceeds to the charging process routine in step S770.

In the second embodiment, the description is made on the vehicle that receives information about the coil structure, and the like, of the power transmitting device through communication, determines the coil type of the power transmitting device and then carries out any one of 1) determining a chargeable parking area, 2) clearly indicating a vehicle stop position to the user and 3) starting the charging sequence.

Thus, even with any power transmitting device, it is possible to smoothly start charging, so the convenience of the user improves.

The second embodiment will be summarized again with reference to the drawings. As shown in FIG. 7 and FIG. 30, the contactless power receiving device according to the second embodiment is the power receiving device that is contactlessly chargeable from the power transmitting device, and includes the power receiving unit 110 that is configured to be able to contactlessly receive electric power from the power transmitting unit 220 installed in the power transmitting device and a guide unit (vehicle ECU 300) that is configured to change a guide position, to which the power receiving device is guided at the time when the power receiving device receives electric power, on the basis of the type of the power transmitting unit 220.

Figure 31B:
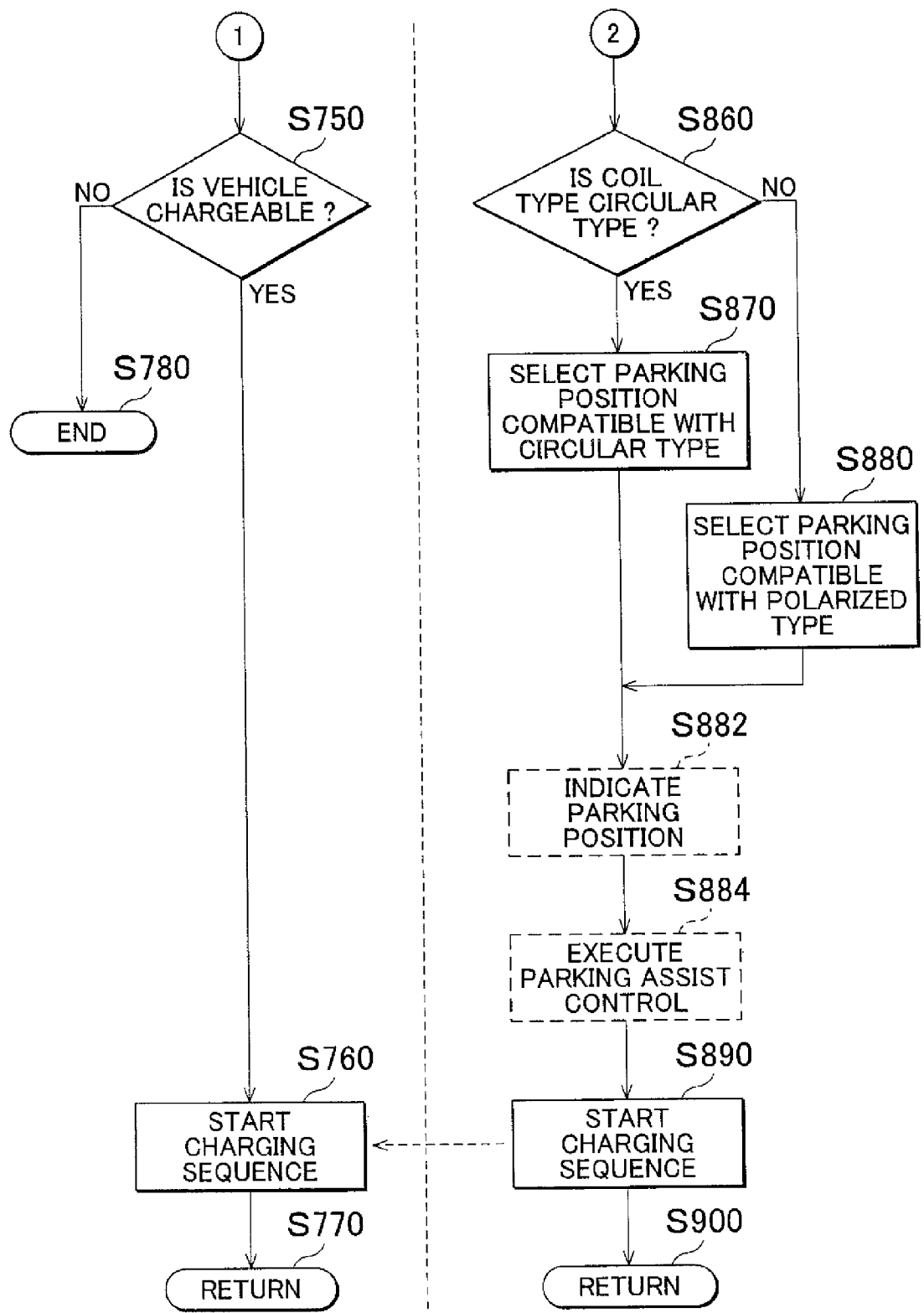

As is executed in step S870 and step S880 in FIG. 31B, the guide unit (vehicle ECU 300) may be configured to, in the case where the type of the power receiving unit 110 and the type of the power transmitting unit 220 are the same, set the position of the power receiving unit (shown in FIG. 27), at which the center position of the power receiving unit 110 coincides with the center position of the power transmitting unit 220, for the guide position, and is configured to, in the case where the type of the power receiving unit 110 and the type of the power transmitting unit 220 are different, set the positions of the power receiving unit 111BX or power receiving unit 111BY (shown in FIG. 28 or FIG. 29), at which the center position of the power receiving unit 111BX or power receiving unit 111BY deviates from the center position of the power transmitting unit 220, for the guide position.

The type of each of the power transmitting unit 220 and the power receiving unit 110 may be classified on the basis of the structure of components (the coil type, such as the circular type and the polarized type, the way of winding the coil, the shape and material of the core, and the like) of the power transmitting unit or power receiving unit, which influences a magnetic flux distribution that is generated in the power transmitting unit and the power receiving unit at the time of reception of electric power.

The guide unit (vehicle ECU 300) may be configured to, in the case where the type of the power transmitting unit is the polarized type, determine the guide position in consideration of the orientation in which the power transmitting unit is installed in the power transmitting device (the orientation of arrangement in the parking space).

The power receiving device may be a vehicle, and the guide unit (vehicle ECU 300) may be configured to inform the parking position, as the guide position, at the time when the vehicle receives electric power to the user of the vehicle in step S882 in FIG. 31B.

The power receiving device may be installed in a vehicle, and the guide unit (vehicle ECU 300) may be configured to assist in parking the vehicle such that the parking position at the time when the vehicle receives electric power is determined as shown in step S884 in FIG. 31B.

The difference between the natural frequency of the power transmitting unit 220 and the natural frequency of the power receiving unit 110 may fall within the range of ±10%.

The coupling coefficient between the power receiving unit 110 and the power transmitting unit 220 may be smaller than or equal to 0.1.

The power receiving unit 110 may be configured to receive electric power from the power transmitting unit 220 through at least one of a magnetic field that is formed between the power receiving unit 110 and the power transmitting unit 220 and that oscillates at a predetermined frequency and an electric field that is formed between the power receiving unit 110 and the power transmitting unit 220 and that oscillates at a predetermined frequency.

In the first and second embodiments, the description is made on the example in which the contactless power transfer system adjusts the positional deviation amount between the power transmitting unit and the power receiving unit on the basis of the type of the coil that is installed in the vehicle. Instead, the contactless power transfer system may not adjust the positional deviation amount but change the parking position itself.

Next, an alternative embodiment to the above-described embodiments will be described. FIG. 32 is a view for illustrating the alternative embodiment. As shown in FIG. 32, a message M5 is transmitted from the vehicle 100 to the charging station 210. The message M5 includes information about the coil type of the power receiving unit that is installed in the vehicle.

The charging station 210 manages a parking space in which a power transmitting unit 220A that includes the circular coil is installed and a parking space in which a power transmitting unit 220B that includes a polarized coil is installed.

A power receiving unit 110B that includes the polarized coil is installed in the vehicle 100. When the charging station 210 receives the message M5 from the vehicle 100, the charging station 210 guides the vehicle 100 to the parking space in which the power transmitting unit that is compatible with the type of the power receiving unit installed in the vehicle 100 is arranged.

Any guiding method is applicable. For example, in the case where the polarized coil is installed in the vehicle, it is possible to use a guiding method in which, as shown in FIG. 32, a guide light 242B installed in the parking space in which the polarized coil is arranged is caused to light up or blink; whereas a guide light 242A installed in the parking space in which the circular coil is arranged remains turned off.

In the case where the circular coil is installed in the vehicle, it is possible to use a guiding method in which, on the contrary to the case of FIG. 32, the guide light 242A installed in the parking space in which the circular coil is arranged is caused to light up or blink; whereas the guide light 242B installed in the parking space in which the polarized coil is arranged remains turned off.

As another guiding method, the charging station 210 may provide information about the position of the parking space to the vehicle 100 and, in response to this, the vehicle 100 may indicate a parking space number on a display device in the vehicle 100 or may show a map or an image that indicate a parking space position.

The present embodiments describe the example in which the power receiving device is the vehicle. Instead, even when the power receiving device is a portable device, the invention is applicable.

While the invention has been described with reference to example embodiments thereof, it is to be understood that the invention is not limited to the example described embodiments or constructions. To the contrary, the invention is intended to cover various modifications and equivalent arrangements. In addition, while the various elements of the example embodiments are shown in various combinations and configurations, other combinations and configurations, including more, less or only a single element, are also within the scope of the invention.

What is claimed is:

1. A contactless power transmitting device comprising:
    a power transmitting unit configured to contactlessly transmit electric power to a power receiving unit installed in a power receiving device, the power receiving unit including a coil; and
    a guide unit configured to change a guide position of the power receiving device on the basis of a type of the coil included in the power receiving unit, the power receiving device being guided to the guide position at the time when the power receiving device receives electric power, wherein the guide unit is configured to, in the case where the type of the coil and a type of the power transmitting unit are the same, set a position of the power receiving unit, at which a center position of the power receiving unit coincides with a center position of the power transmitting unit, for the guide position, and the guide unit is configured to, in the case where the type of the coil and the type of the power transmitting unit are different from each other, set a position of the power receiving unit, at which the center position of the power receiving unit deviates from the center position of the power transmitting unit, for the guide position.

2. The vehicle according to claim 1, wherein
the type of each of the power transmitting unit and the coil is classified on the basis of a structure of a component of the power transmitting unit the structure influencing a magnetic flux distribution generated in the power transmitting unit and the power receiving unit at the time of transmission of electric power.

3. The contactless power transmitting device according to claim 1, wherein
the guide unit is configured to, in the case where the type of the coil is a polarized coil type, determine the guide position in consideration of an orientation in which the power receiving unit is installed in the power receiving device.

4. The contactless power transmitting device according to claim 1, wherein
the power receiving device is a vehicle, and the guide unit is configured to inform a parking position at the time when the vehicle receives electric power to a user of the vehicle as the guide position.

5. The contactless power transmitting device according to claim 1, wherein
the power receiving device is a vehicle, and the guide unit is configured to assist in parking the vehicle such that a parking position at the time when the vehicle receives electric power is determined.

6. The contactless power transmitting device according to claim 1, wherein
a difference between the natural frequency of the power transmitting unit and the natural frequency of the power receiving unit falls within the range of ±10%.

7. The contactless power transmitting device according to claim 1, wherein
a coupling coefficient between the power receiving unit and the power transmitting unit is smaller than or equal to 0.1.

8. The contactless power transmitting device according to claim 1, wherein
the power transmitting unit is configured to transmit electric power to the power receiving unit through at least one of a magnetic field and an electric filed, the magnetic field being formed between the power receiving unit and the power transmitting unit, the magnetic field oscillating at a predetermined frequency, the electric field being formed between the power receiving unit and the power transmitting unit, and the electric field oscillating at a predetermined frequency.

9. A contactless power receiving device that is contactlessly chargeable from a power transmitting device, comprising:

a power receiving unit configured to contactlessly receive electric power from a power transmitting unit installed in the power transmitting device; the power transmitting unit including a coil; and a guide unit configured to change a guide position of the power receiving device on the basis of a type of the power transmitting unit, the power receiving device being guided to the guide position at the time when the power receiving device receives electric power, wherein the guide unit is configured to, in the case where a type of the power receiving unit and the type of the coil are the same, set a position of the power receiving unit, at which a center position of the power receiving unit coincides with a center position of the power transmitting unit, for the guide position, and the guide unit is configured to, in the case where the type of the power receiving unit and the type of the coil are different, set a position of the power receiving unit, at which the center position of the power receiving unit deviates from the center position of the power transmitting unit, for the guide position.

10. The contactless power receiving device according to claim 9, wherein
the type of each of the power transmitting unit and the power receiving unit is classified on the basis of a structure of a component of the power transmitting unit or the power receiving unit, the structure influencing a magnetic flux distribution generated in the power transmitting unit and the power receiving unit at the time of reception of electric power.

11. The contactless power receiving device according to claim 9, wherein
the guide unit is configured to, in the case where the type of the coil is a polarized coil type, determine the guide position in consideration of an orientation in which the power transmitting unit is installed in the power transmitting device.

12. The contactless power receiving device according to claim 9, wherein
the power receiving device is a vehicle, and the guide unit is configured to inform a parking position at the time when the vehicle receives electric power to a user of the vehicle as the guide position.

13. The contactless power receiving device according to claim 9, wherein
the power receiving device is a vehicle, and the guide unit is configured to assist in parking the vehicle such that a parking position at the time when the vehicle receives electric power is determined.

14. The contactless power receiving device according to claim 9, wherein
a difference between the natural frequency of the power transmitting unit and the natural frequency of the power receiving unit falls within the range of ±10%.

15. The contactless power receiving device according to claim 9, wherein
a coupling coefficient between the power receiving unit and the power transmitting unit is smaller than or equal to 0.1.

16. The contactless power receiving device according to claim 9, wherein
the power receiving unit is configured to receive electric power from the power transmitting unit through at least one of a magnetic field and an electric field, the magnetic field being formed between the power receiving unit and the power transmitting unit, the magnetic field oscillating at a predetermined frequency, the electric field being formed between the power receiving unit and the power transmitting unit, and the electric field oscillating at a predetermined frequency.

17. A contactless power transfer system comprising:
a power receiving device; and
a power transmitting device including: a power transmitting unit configured to contactlessly transmit electric power to a power receiving unit installed in the power receiving device, the power receiving unit including a coil; and
a guide unit configured to change a guide position of the power receiving device on the basis of a type of the power receiving unit, the power receiving device being guided to the guide position at the time when the power receiving device receives electric power, and the power transmitting device being configured to contactlessly transmit electric power to the power receiving device, wherein
the guide unit is configured to, in the case where the type of the coil and a type of the power transmitting unit are the same, set a position of the power receiving unit, at which a center position of the power receiving unit coincides with a center position of the power transmitting unit, for the guide position, and
the guide unit is configured to, in the case where the type of the coil and the type of the power transmitting unit are different from each other, set a position of the power receiving unit, at which the center position of the power receiving unit deviates from the center position of the power transmitting unit, for the guide position.

18. A contactless power transfer system comprising:
a power transmitting device; and
a power receiving device including: a power receiving unit configured to contactlessly receive electric power from a power transmitting unit installed in the power transmitting device, the power transmitting unit including a coil; and
a guide unit configured to change a guide position on the basis of a type of the coil included in the power transmitting unit, the power receiving device being guided to the guide position at the time when the power receiving device receives electric power, and the power receiving device being configured to contactlessly receive electric power from the power transmitting device, wherein
the guide unit is configured to, in the case where a type of the power receiving unit and the type of the coil are the same, set a position of the power receiving unit, at which a center position of the power receiving unit coincides with a center position of the power transmitting unit, for the guide position, and
the guide unit is configured to, in the case where the type of the power receiving unit and the type of the coil are different, set a position of the power receiving unit, at which the center position of the power receiving unit deviates from the center position of the power transmitting unit, for the guide position.

* * * * *